United States Patent [19]

Kishimoto et al.

[11] Patent Number: 5,065,344
[45] Date of Patent: Nov. 12, 1991

[54] METHOD OF AND APPARATUS FOR OBTAINING IMAGE DATA USED FOR FILLING INNER OR OUTER REGION OF GRAPHIC FIGURE

[75] Inventors: Katsumi Kishimoto; Shigeaki Shimazu, both of Kyoto, Japan

[73] Assignee: Dainippon Screen Mfg., Co. Ltd., Japan

[21] Appl. No.: 249,641

[22] Filed: Sep. 26, 1988

[30] Foreign Application Priority Data

Sep. 25, 1987 [JP]   Japan ................................ 62-241398

[51] Int. Cl.⁵ .............................................. G06F 15/62
[52] U.S. Cl. .................................................. 395/134
[58] Field of Search ....................... 364/518, 521, 522; 340/721, 723, 744, 745, 747; 382/44–48

[56] References Cited

U.S. PATENT DOCUMENTS 4,528,642  7/1985  Waller ................................. 364/900
4,646,076  2/1987  Wiedenman et al. ............ 340/703 X
4,745,575  5/1988  Hawes ................................ 364/900
4,763,119  8/1988  Matsubara et al. ............. 340/728 X
4,808,988  2/1989  Burke et al. .................... 340/745 X

FOREIGN PATENT DOCUMENTS 63-31822  6/1988  Japan .

Primary Examiner—Heather R. Herndon
Attorney, Agent, or Firm—Ostrolenk, Faber, Gerb & Soffen

[57] ABSTRACT

Segment data expressing segments which form the contour of a graphic figure are provided. Connection mode data expressing the connection modes between the segments are generated. The loops included in the graphic figure are detected on the basis of the segment data and the connection mode data. Even if the segments imperfectly define the contour, the loops can be detected through the step of correcting the segment data and the connection mode data.

17 Claims, 35 Drawing Sheets $0 < dis < d_{MAX}$

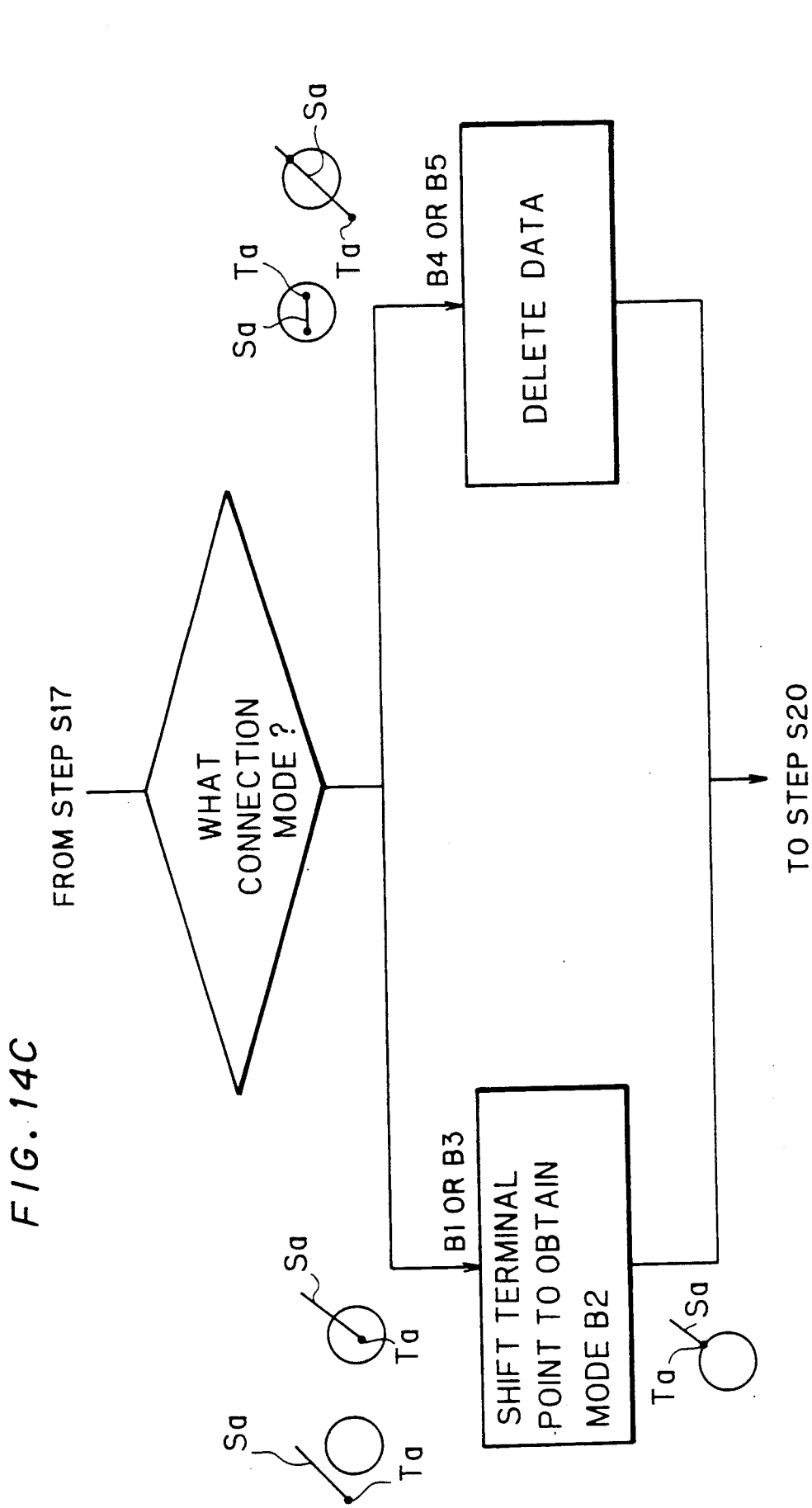

FIG. 19D
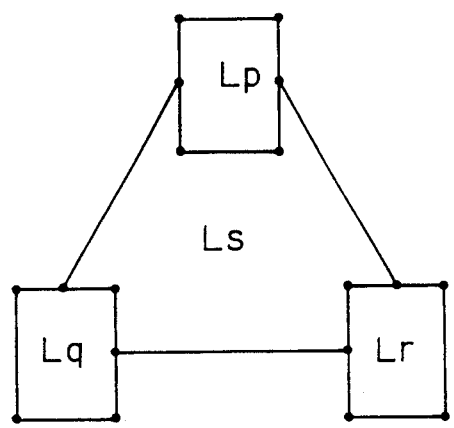
FIG. 19A
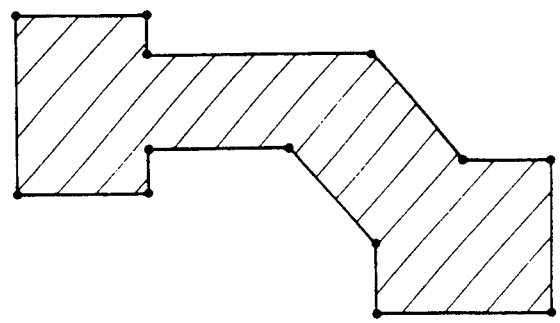
FIG. 19B
FIG. 19E
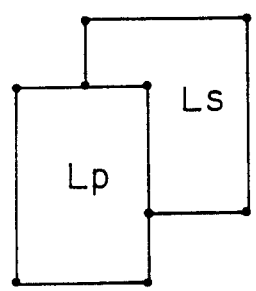
FIG. 19C
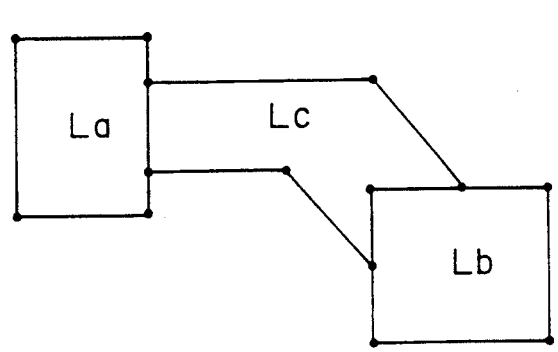

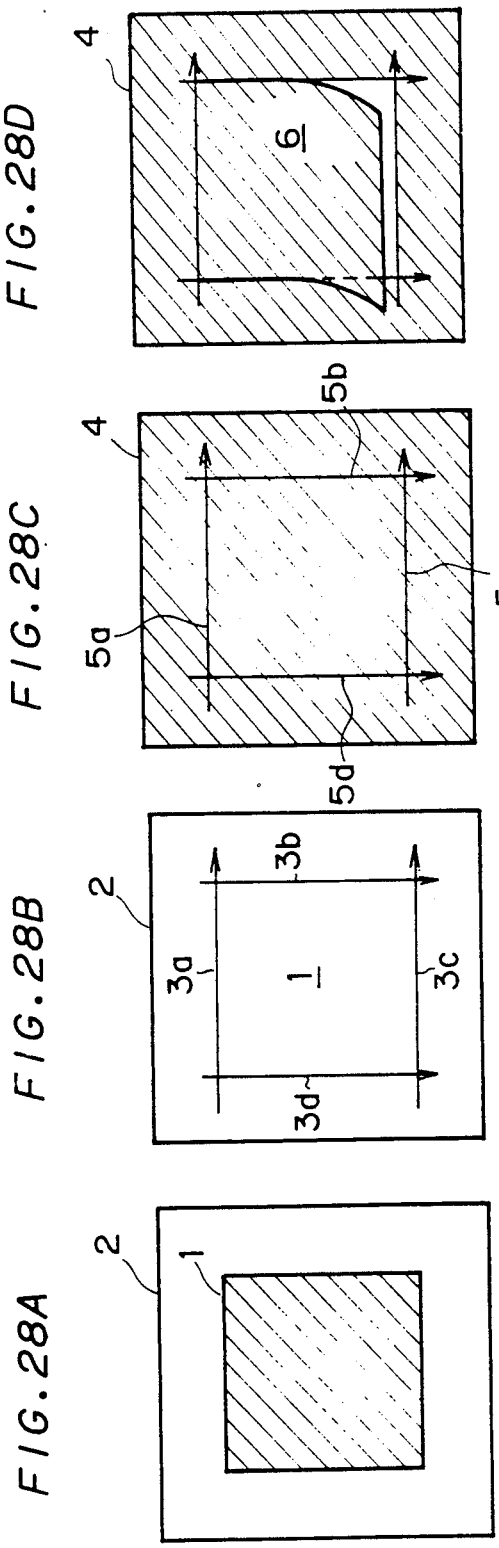
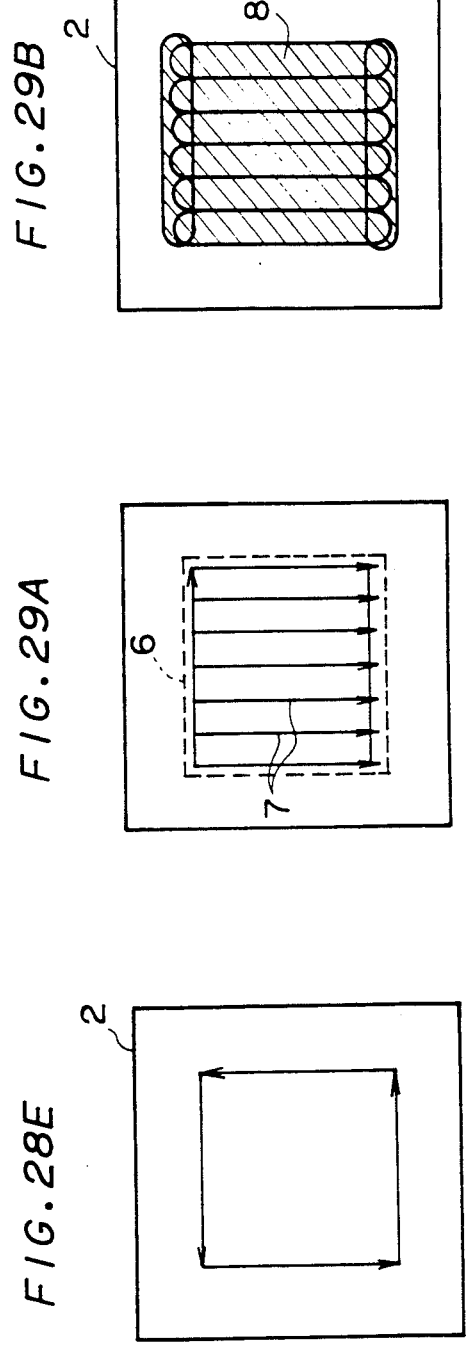

METHOD OF AND APPARATUS FOR OBTAINING IMAGE DATA USED FOR FILLING INNER OR OUTER REGION OF GRAPHIC FIGURE

BACKGROUND OF THE INVENTION

1. Field of the Invention

The present invention relates to a method of and apparatus for inputting graphic data provided in the form of a set of segments, to convert the same into image data for use in filling the inner or outer region of a graphic figure whose contour line is expressed by the segments.

2. Description of Backqround Arts

In the printing field, the inner or outer region of a graphic figure is often filled with a monochromatic color to produce a cut mask or a pattern mask for use in making a printed wiring board.

In a conventional filling process, a cutting machine is employed. For example, consider a mask film 2 shown in FIG. 28A, in which the inner region of the graphic FIG. 1 should be filled with a monochromatic color. In manufacturing the mask film 2, data expressing segments 3a-3d (FIG. 28B) defining the contour line of the graphic FIG. 1 are prepared by means of a computer aided design technique (CAD). In FIG. 28B, the segments 3a-3d are illustrated as vectors in order to indicate their respective directions. The data expressing the segments 3a-3d are then delivered to a cutting machine (not shown). The cutting machine automatically cuts a peel off film 4 shown in FIG. 28C to form slits 5a-5d thereon corresponding to segments 3a-3d.

A part of the peel off film 4 corresponding to the inner region 6 (FIG. 28D) surrounded by the slits 5a-5d is then manually removed to obtain a cut mask film in which only the inner region 6 is transparent. The cut mask film is inversely printed on another film through a contact printing process to obtain the mask film 2 (FIG. 28A) in which only the inner region of the graphic figure 1 is opaque.

In another conventional technique, a photoplotter is employed. To manufacture the mask film 2 with this technique, graphic data expressing the graphic FIG. 1 are prepared by means of CAD (as in the first technique). However, the graphic data are not identical to those in the first technique in that they express a set of segments 7 (FIG. 29A) filling the inner region 6 rather than the segments 3a-3d defining the contour line. The graphic data expressing the segments 7a are then delivered to the photoplotter (not shown).

The photoplotter scans the surface of a photosensitive film with a light beam along the segments 7 while controlling the light beam so that it is in ON state on the segments 7 and in OFF state on the other region, whereby the photosensitive film 2 shown in FIG. 29B is exposed along the trace 8 of the exposure light beam. The exposed photosensitive film 2 is then developed to obtain the desired film 2 of FIG. 28A having the filled region.

The first conventional technique (employing the cutting machine) has an advantage in that the graphical data can be easily prepared since the first technique requires only the data expressing the segments 3a-3d which define the contour line of the graphical FIG. 1. The segments 3a-3d may be crossed without terminating at a common point, since the respective parts of the slits 5a-5d extending over the other slits do not substantially hinder the opaque character of the outer region in the film 4. However, the technique has a disadvantage in that an operator must be skilled to manually take off the region 6 of the peel off film 4. Further, the efficiency of the manual operation is low and the desired film cannot be easily obtained.

The second conventional technique does not require a manual operation. The desired film 2 can be obtained automatically. However, since the diameter of the exposure beam spot is small, it takes a long time to fill the inner region of a graphic figure—particularly when the inner region has a relatively wide area. Sometimes, a portion between adjacent segments is left unfilled even after scanning is completed. Further, it takes a long time to prepare the graphic data with CAD.

Under the circumstances, it is desirable to develop a system in which graphic data is prepared through CAD or the like only for a contour line. Further, it is desirable to develop a system in which filling is automatically conducted at a high speed. The desirable system may be constructed with a laser plotter in which exposure scanning with a laser beam is controlled according to run length data To obtain the run length data, graphic data must be prepared which includes information with respect to a contour line which can be drawn with a single stroke, as shown in FIG. 28E as well as information indicating whether the inner region of the contour line is to be filled or to be left unfilled. A contour line which can be drawn with a single stroke is hereinafter referred to as a "single stroke contour line".

Although such graphic data can be prepared through CAD dedicated to the laser plotter, it is desired to obtain the graphic data from graphic data prepared for the cutting machine. However, a contour line expressed by the graphic data prepared for the cutting machine is not always a single stroke contour line. Therefore, when the graphic data for the cutting machine is employed for controlling the laser plotter, it is necessary to distinguish the inner region from the outer region of the graphic FIG. 1 on the basis of the graphic data indicating the segments 3a-3d of FIG. 28B which imperfectly express the contour line. The distinction process will be complicated since graphic figures have many variations. Thus, the desired system will not be obtained unless a technique is developed in which imperfection in segment connection is detected and a single stroke contour line is reproduced at high efficiency and high speed.

SUMMARY OF THE INVENTION

The present invention is directed to a method of processing data for use in filling a region which is inside or outside of a graphic figure. The method includes: (a) preparing segment data representative of segments which form a contour of a graphic figure on an image plane (the segments defining connection modes therebetween); (b) using the segment data to generate connection mode data representative of the connection modes; (c) using the connection mode data to select a first one of the segments (the first segment has a floating terminal point); (d) subsequent to the step (c), correcting the segment data and the connection mode data so that the first segment does not have a floating terminal point; (e) subsequent to the step (d), using the connection mode data to detect a loop formed by the segments and to obtain loop data representative of the loop; and (f) subsequent to the step (e), using the loop data and the segment data to obtain data for use in filling a region which is inside or outside of the loop.

In a preferred embodiment, the step (b) includes the steps of: (b-1) specifying a plurality of rectangles on the image plane (the rectangles surrounding the segments); (b-2) selecting interrelated rectangles from among the plurality of rectangles (the interrelated rectangles surrounding a plurality of the segments, the interrelated rectangles overlapping each other on the image plane); and (b-3) determining the respective connection modes between the segments surrounded by the interrelated rectangles.

In a preferred embodiment, the step (b-2) includes the steps of: (b-2-1) dividing the image plane repeatedly to obtain a tree of divisional areas (each one of the divisional areas being related to another of the divisional areas according to a predetermined sequence of division); (b-2-2) comparing each of the plurality of rectangles with the divisional areas to determine respective minimum divisional areas which include the rectangles; and (b-2-3) identifying respective minimum divisional areas which are related according to the sequence.

In a preferred embodiment, the interrelated rectangles surround the segments with a predetermined margin.

In a preferred embodiment, the data for use in filling the region is delivered to an image recorder to fill the region along scanning lines; and each of the rectangles has two pairs of opposite sides (one of the pairs being parallel to the scanning lines).

In a preferred embodiment, the connection mode data is stored in a memory as a data base.

In a preferred embodiment, each one of the connection modes is classified as either a perfect connection mode or an imperfect connection mode (the perfect connection mode being defined as a mode in which a terminal point of a segment coincides with a terminal point of another segment, the imperfect connection mode being defined as a mode other than the perfect connection mode); and the step (c) includes using the connection mode data to detect a segment which is connected to another segment in an imperfect connection mode.

In a preferred embodiment, the step (e) includes the steps of: (e-1) detecting a fundamental loop in which segments are serially connected only in a fundamental connection mode (the fundamental connection mode being defined as a mode wherein a terminal point of one segment coincides with a terminal point of another segment); and (e-2) detecting a bridging loop formed by a segment bridging between detected loops; and the loop data is representative of the fundamental loops and the bridging loop.

In a preferred embodiment, the step (e) further includes the steps of: (e-3) generating a connection point sequence table (the connection point sequence table representing a sequence of connection points of a first loop, the connection points being points at which the first loop is connected to segments other than segments forming the first loop); and the step (e-2) further the steps of: (e-2-1) tracing a chain of segments from the first loop to a second loop; (e-2-2) subsequent to the step (e-2-1), selecting a second connection point from the connection point sequence table (the second connection point following a connection point at which the tracing reaches the second loop); and (e-2-3) tracing a chain of segments from the second connection point.

In a preferred embodiment, the segments are vectors (each of the vectors being defined by a start point and an end point, the segment data including coordinates of the start points and the end points); a plurality of loops are detected during the step (e) (the loops including clockwise loops and counterclockwise loops determined with respect to the direction of the vectors); and the step (f) includes the steps of: (f-1) determining a mutual inclusion relationship between the plurality of loops; and (f-2) changing the start point and end point of each segment so that a clockwise loop and an anticlockwise loop occur alternately within the mutual inclusion relationship (provided that an outermost loop has a loop direction determined according to a plan for filling a graphic figure).

In a preferred embodiment, the segment data is adapted for use in a cutting machine.

The present invention is also directed to a data processor for converting segment data representative of segments which form a contour of a graphic figure into image data for filling a region which is inside or outside of the graphic figure. The data processor includes: (a) connection mode data generating means for generating connection mode data representative of connection modes between segments which form a contour of a graphic figure (the segments being represented by segment data); (b) a memory for storing the connection mode data as a data base; (c) correction means for correcting the segment data and the connection mode data to create corrected data representative of a state wherein a terminal point of each of the segments coincides with a terminal point of another of the segments; (d) a loop detecting means for detecting a loop formed by the segments with reference to the corrected data to obtain loop data representative of the loop; and (e) image data generating means for generating image data for filling a region which is inside or outside of the loop, the image data generating means being responsive to the loop data and the segment data.

In a preferred embodiment, the connection mode data generating means includes: (a-1) positional relationship determining means for determining a positional relationship between a terminal point of a segment and a terminal point of another segment; and (a-2) means for generating the connection mode data according to the positional relationship.

In a preferred embodiment, the connection mode data generating means further includes: (a-3) means for specifying a plurality of rectangles surrounding the segments in an image plane; (a-4) means for selecting interrelated rectangles from among the plurality of rectangles, the interrelated rectangles overlapping each other on the image plane; and (a-5) means for delivering a portion of the segment data corresponding to segments surrounded by the interrelated rectangles to the positional relationship determining means.

In a preferred embodiment, the loop detecting means includes: (d-1) means for tracing a chain of segments which are serially connected only in a fundamental connection mode to detect a fundamental loop (the fundamental connection mode being defined as a mode wherein a terminal point of a segment coincides with a terminal point of another segment, the fundamental loop being defined as a loop in which segments are serially connected only in the fundamental connection mode); (d-2) means for tracing a chain of segments to detect a bridging loop; and (d-3) means for generating the loop data with respect to both the fundamental loops and the bridging loop.

The present invention is also directed to a method of sorting segments defined with respect to an image plane into segment groups to detect a loop formed by the segments in each of the segment groups. The method includes: (a) receiving segment data representative of segments defined with respect to an image plane; (b) specifying rectangles which surround the segments in the image plane; (c) determining areas in which the rectangles are located on the image plane; (d) sorting the rectangles into rectangle groups so that all of the rectangles which belong to one of the areas are identified as a rectangle group; and (e) sorting the segments into segment groups (each one of the segment groups including segments corresponding to rectangles of a rectangle group).

In a preferred embodiment, the rectangles define predetermined margins around the segments.

In a preferred embodiment, the step (c) includes the steps of: (c-1) repeatedly dividing the image plane to obtain a tree of divisional areas in which each of the divisional areas is related according to a predetermined sequence of division; and (c-2) comparing each of the rectangles with the divisional areas to determine minimum divisional areas which include the rectangles; and the step (d) includes sorting the rectangles according to the minimum divisional areas.

Objects, features, aspects and advantages of the present invention will become more apparent from the following detailed description of the present invention when taken in conjunction with the accompanying drawings.

BRIEF DESCRIPTION OF THE DRAWINGS

FIGS. 13(a)-(b) and FIGS. 14(a)-(e) are flowcharts showing a terminal point correction proess.

FIGS. 15(a)-(f) through FIGS. 19(a)-(e) are diagrams showing examples of the terminal point correction, FIGS. 28(a)-(e) and FIGS. 29(a)-(b) are explanatory diagrams showing image data processing for filling an inner region of a graphic figure.

DESCRIPTION OF THE PREFERRED EMBODIMENTS

A. Overall Structure and Overall Operation of the Preferred Embodiment

Figure 1:
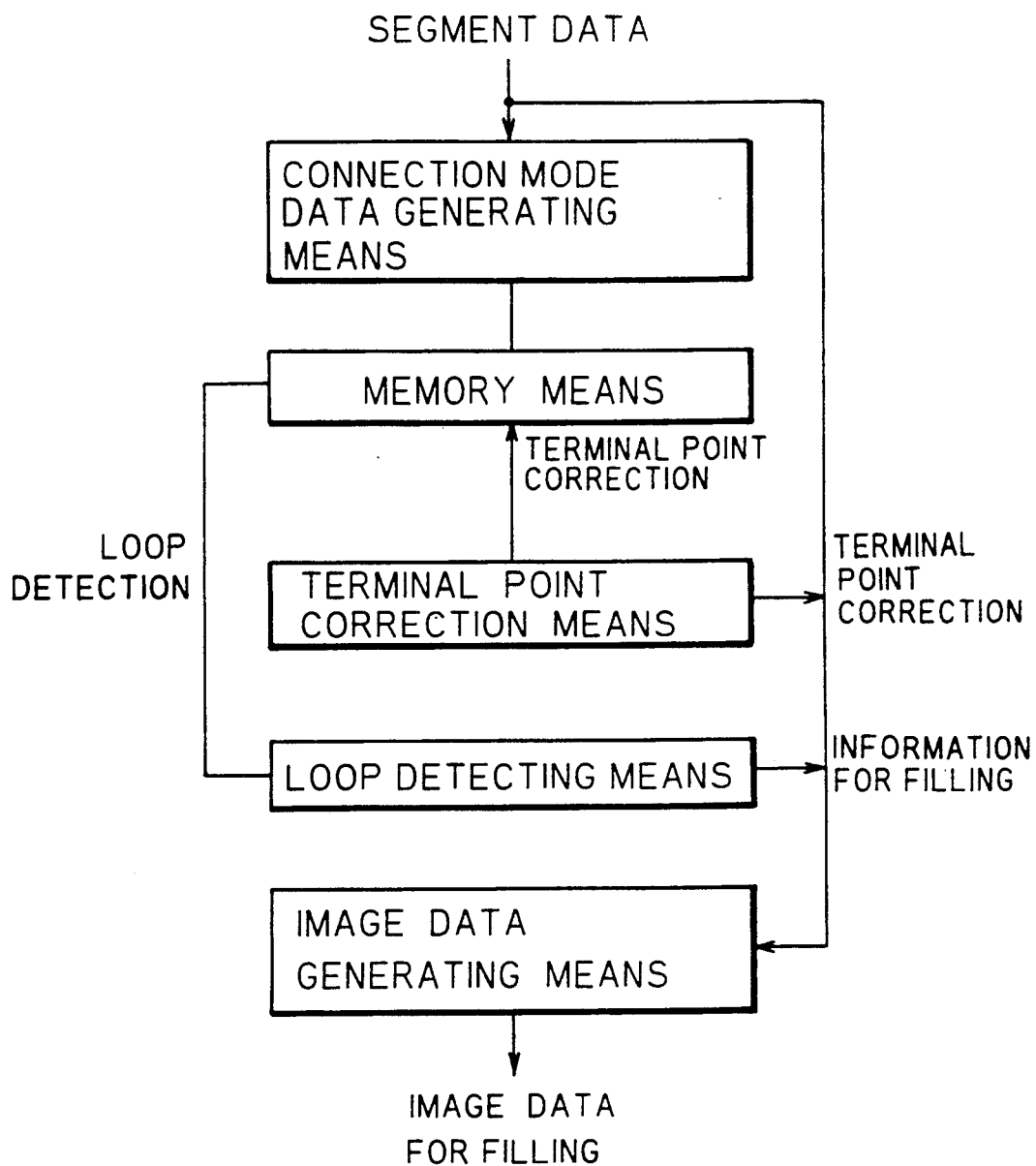
FIG. 1 is a function diagram showing the construction of the present invention.
Figure 2:
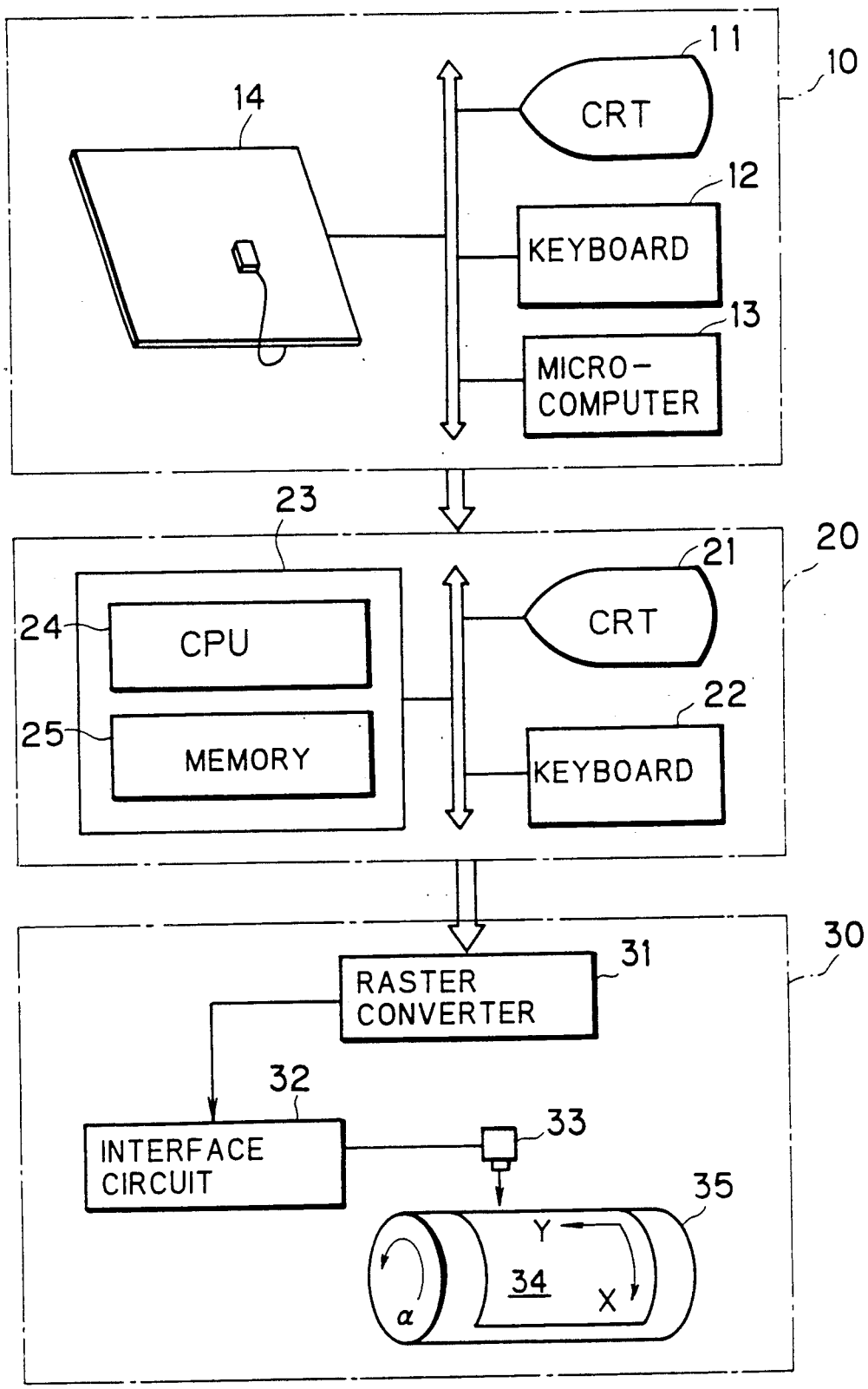
FIG. 2 is a block diagram showing an overall structure of an image processing system having an image converter according to a preferred embodiment of the present invention.

Referring to FIG. 2, data with respect to the contour line of a graphic figure to be recorded is produced in a CAD system 10. The CAD system 10 has a CRT 11, a keyboard 12, a microcomputer 13 and a digitizer 14. When it is desired to fill the hatched region illustrated in FIG. 3H, for example, segment data with respect to segments a-t (FIG. 3A) expressing the respective contour lines of the graphic figures are inputted to the CAD system 10 by means of the digitizer 14 (process step Sl in FIG. 4A). The segment data include respective start point coordinates and end point coordinates of the segments a-t. With respect to the segment a in FIG. 3A, for example, the two dimensional coordinates of the start point $a_S$ and the end point $a_E$ thereof are provided in the segment data. A segment t is a circle, and its shape and position in the image plane are identified by the coordinates of its central point $t_0$ and the value of its radius $t_R$, which are also inputted to the CAD system 10.

Figure 3A:
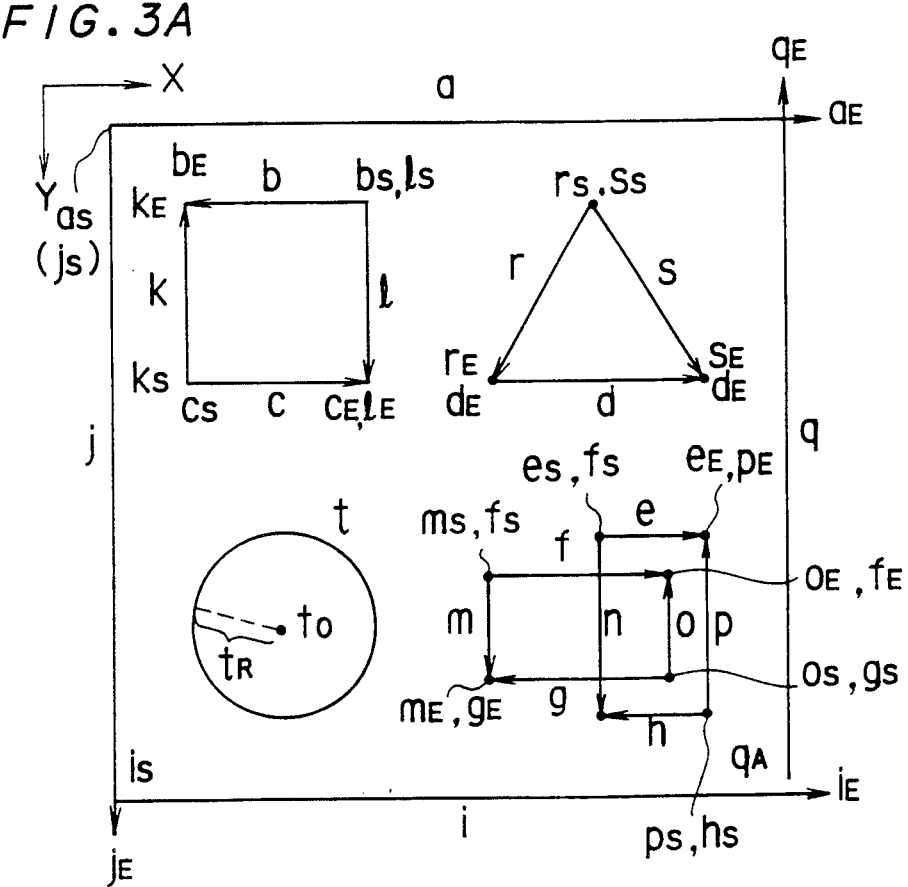
FIG. 3A through FIG. 3H are diagrams showing data conversion sequence with respect to graphic figures.

The input operation of the segment data to the CAD system 10 is conducted as in the system employing a cutting machine. Therefore, the segments a-t expressed by the segment data may be crossed or separated from each other. In other words, the segments a-t may not be in "perfect connection mode" which is defined as the state where the terminal points, i.e., the start point and the end point of each segment, are just connected to the terminal points of another segment. For example, as shown in FIG. 3A, the end point $a_E$ of the segment a is not located at the position of the end point $q_E$ of the segment q. Connection states other than the perfect connection state will be hereinafter referred to as "imperfect connection modes". A terminal point which is not located on another segment such as the end points $a_E$ and $a_q$ will be referred to as "a floating terminal point" or "a floating start (end) point".

Referring again to FIG. 2, the segment data prepared in the CAD system 10 is delivered to an image data converter 20 through on-line or off-line transmission. The image data converter 20 has a CRT 21, a keyboard 22 and a microcomputer 23. The microcomputer 23 includes a CPU 24 and a memory 25.

Figure 3C:
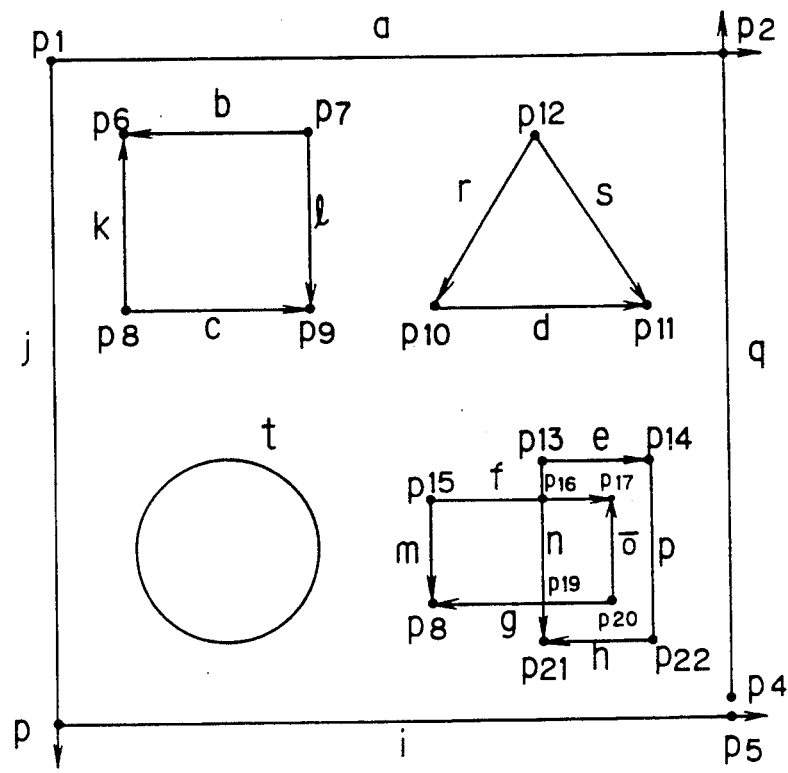
Figure 3B:
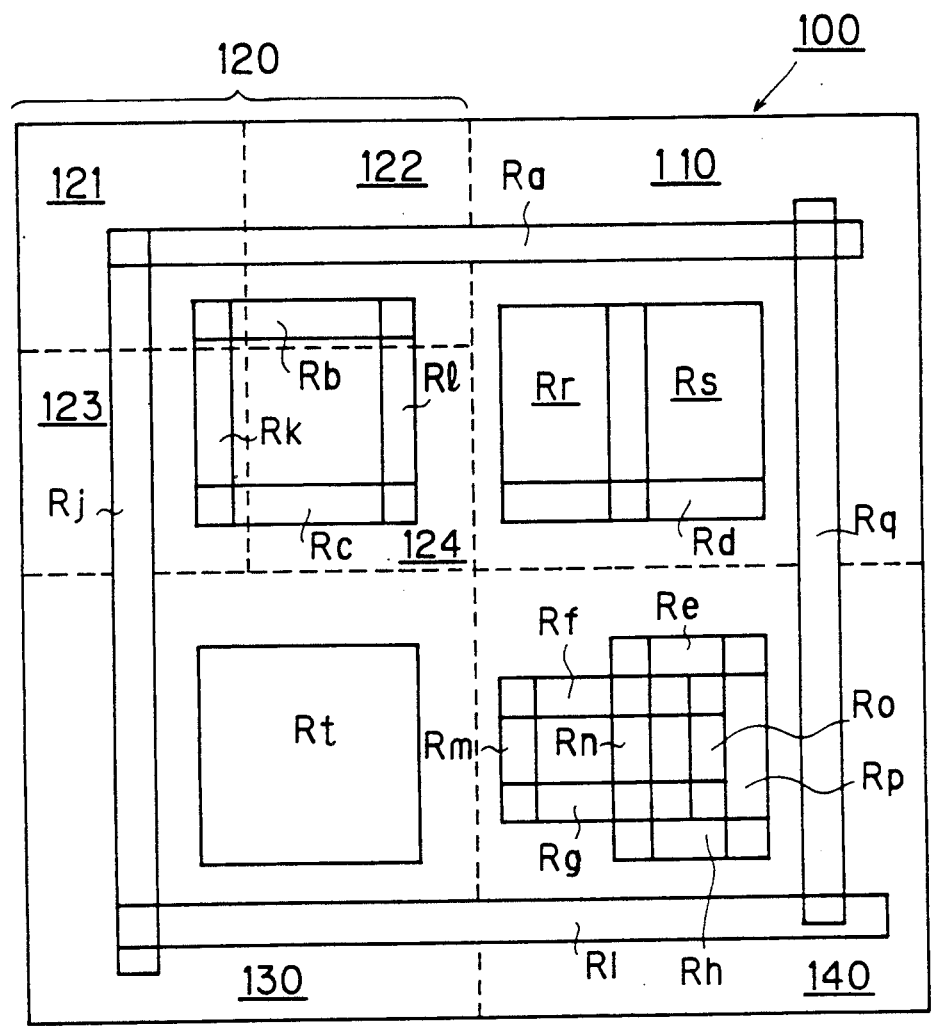
Figure 3D:
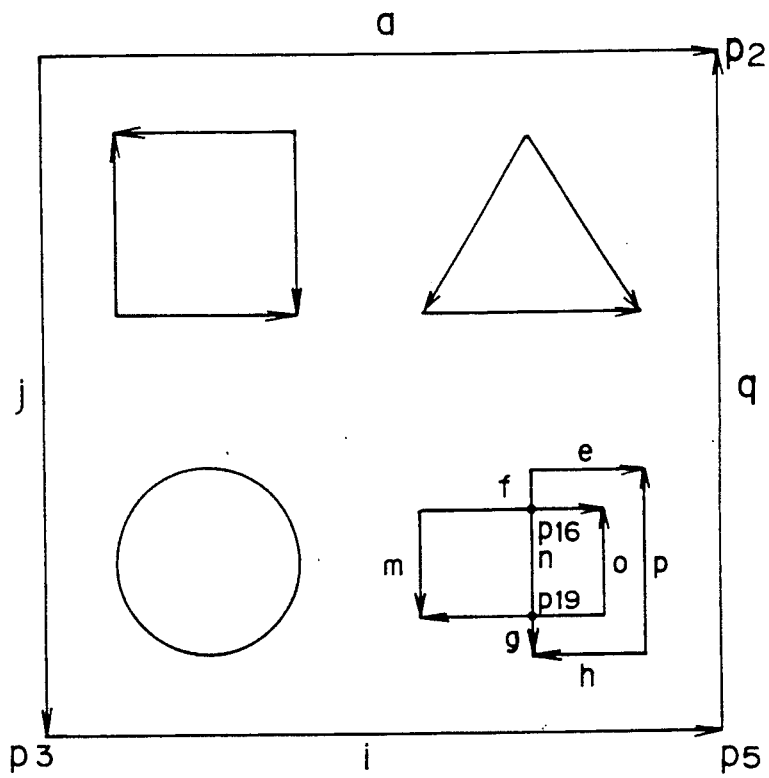
Figure 3E:
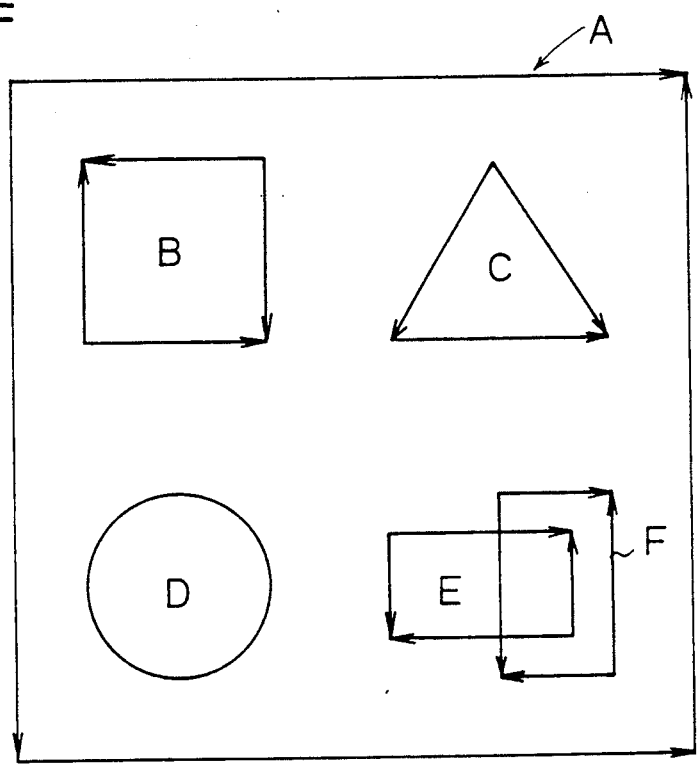
Figure 3F:
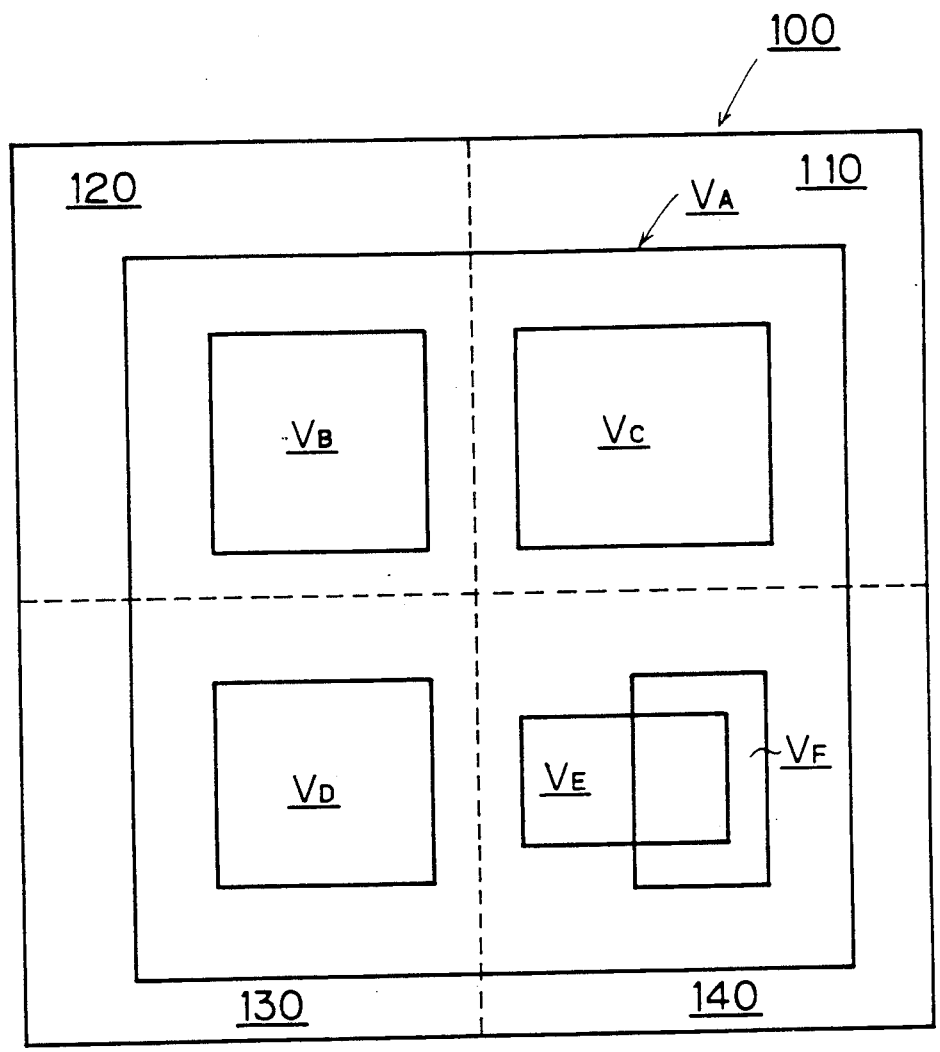
Figure 3G:
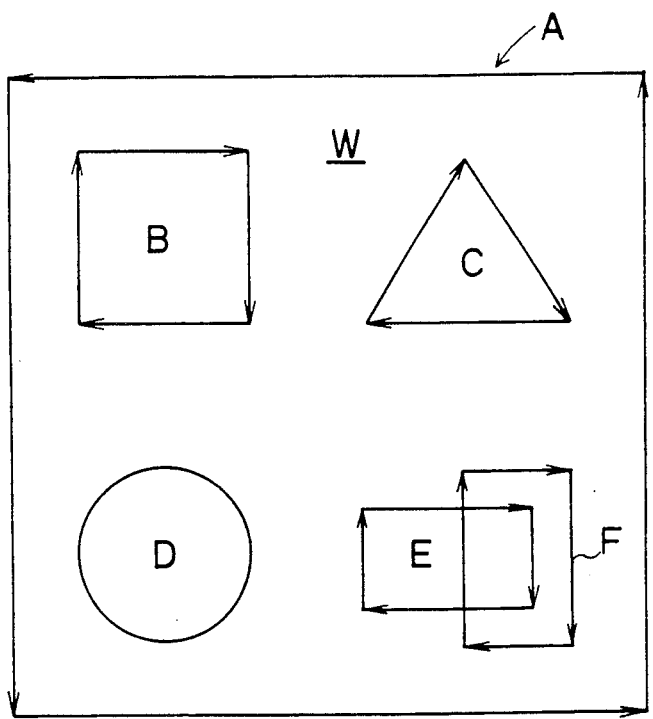

The image data converter 20 receives the segment data with respect to the segments a–t, and converts the segment data into image data expressing the image shown in FIG. 3G. The conversion includes the following processes (a) through (e), details of which will be described later.

(a) Connection Mode Data Generatinq Process

In process (a), the connection mode between the respective terminal points of the segments a–t are detected to generate "connection mode data" expressing the connection mode between the segments a–t. In the preferred embodiment, process (a) is conducted through the following sub-processes (a-1) and (a-2).

(a-1) Segment Classification Process

This is a sub-process to roughly find which segments may be connected with each other within the segments a–t, as a preliminary process of the connection mode data generation. More particularly, an image plane on which the segments a–t are given is imaginarily divided into a plurality of divisional areas, and divisional areas are associated with the segments a–t. The segments a–t are classified into segment groups according to their associated areas.

Since segments associated with different areas cannot be connected to each other, segments which are associated with different areas are not subjected to sub-process (a-2) (detecting a connection mode between segments).

By conducting sub-process (a-1) before subprocess (a-2), sub-process (a-2) can be carried out at high efficiency because pairs of segments which have no possibility of mutual connection are eliminated from consideration under sub-process (a-2). As will be described later in detail with reference to FIG. 3B, sub-process (a-1) is carried out through "rectangular approximation" and a "quadruple branching classification method", as indicated in process step S2 in FIG. 4A. Data obtained in sub-process (a-1) (indicating the contents of the segment groups) are called "segment classification data".

(a-2) Segment Connection Mode Detection Process

In sub-process (a-2), the connection modes between the segments a–t are detected by detecting the connection modes between the respective terminal points classification process (a-1) into consideration. Connection mode data are generated on the basis of the detected segment connection modes. For example, the connection mode between the end points $a_E$ and $q_E$ is detected and recognized as in "connection mode A2 (FIG. 10B)", according to a classification rule described later. For each of the segments a–t, the connection mode data includes information with respect to:

the other segment to which the segment is connected;
the connection mode by which the segment is connected to the other segment; and
the characteristic point of the connection.

For example, the connection between segments a and q in FIG. 3C is represented by the characteristic point p2 which is the cross point of the segments a and q. Sub-process (a-2) is indicated as process step S3 in FIG. 4A.

(b) Connection Mode Data Storace Process

Figure 4A:
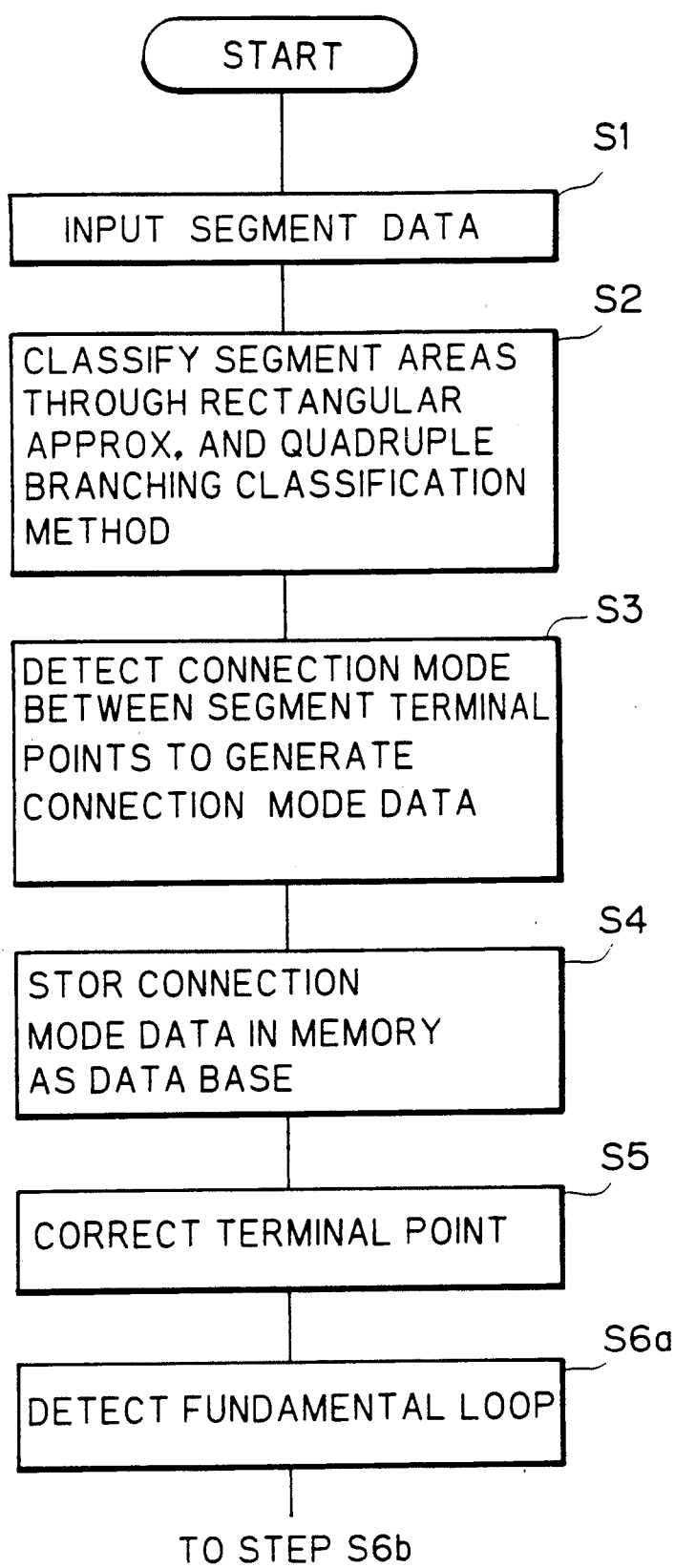
FIGS. 4(a)-(b) are flowchart showing the overall operation of the preferred embodiment.

The connection mode data obtained through process (a) are stored in the memory 25 as a data base (process step S4 in FIG. 4A). The data base is utilized in the following processes (c), (d) and the like.

In the present invention, the term "data base" is used to indicate a data system in which data included therein are arranged according to a predetermined data arrangement rule, and the data can be systematically accessed or corrected from the exterior of the memory. Since the connection mode data with respect to the segments a–t are systematically classified and arranged into the data base, the following processes can be carried out at high efficiency and high speed.

(c) Terminal Point Correction Process

Process (c) is intended for correcting the terminal point coordinates of a segment in the imperfect connection mode. The terminal point coordinates are corrected on the basis of the connection mode data stored in the memory 25, so that a segment in the imperfect connection mode is converted into the perfect connection mode (process step S5 in FIG. 4A). In other words, the chain of segments is corrected into a graphical figure having a single stroke contour line. In process (c), the connection mode data and the segment data are corrected with reference to the contents of the connection mode data. Through process (c), data expressing corrected graphical figures (show!n in FIG. 3D, for example) are obtained.

(d) Loop Detection Process

When process (c) is completed, there is no segment in the imperfect connection mode, and all of the chains of segments are single stroke contour lines corresponding to the desired closed graphical figures. Each of the chains of segments is traced with reference to the data base through which a contour line forming a loop is detected. In FIG. 3E, loops A–F are illustrated.

In the preferred embodiment, loop detection is efficiently carried out through the following sub-processes (d-1) and (d-2).

(d-1) Fundamental Loop Detection Process

The connection modes between the terminal points of the segments are classified into (a) "a fundamental connection mode" in which the terminal point of one segment is located at the same position as the terminal point of another segment and (b) "other connection modes". The fundamental connection mode is shown in FIG. 10C as "connection mode A3".

In sub-process (d-1), a loop in which segments are serially connected in only the fundamental connection mode is detected by tracing segments serially connected in the fundamental connection mode (process step S6a in FIG. 4A). In the present application, such a loop is called "a fundamental loop". The loops $L_a$ and $L_b$ (illustrated in FIG. 19C and FIG. 21B) are examples of a fundamental loop.

(d-2) Bridging Loop Detection Process

In sub-process (d-2), a chain of segments at least one of which is connected with another segment in a connection mode other than the fundamental connection mode is traced to detect "a bridging loop" which is formed by bridging between points on one or more fundamental loops. The loop $L_c$ in FIG. 19C is an example of a bridging loop.

Figure 21A:
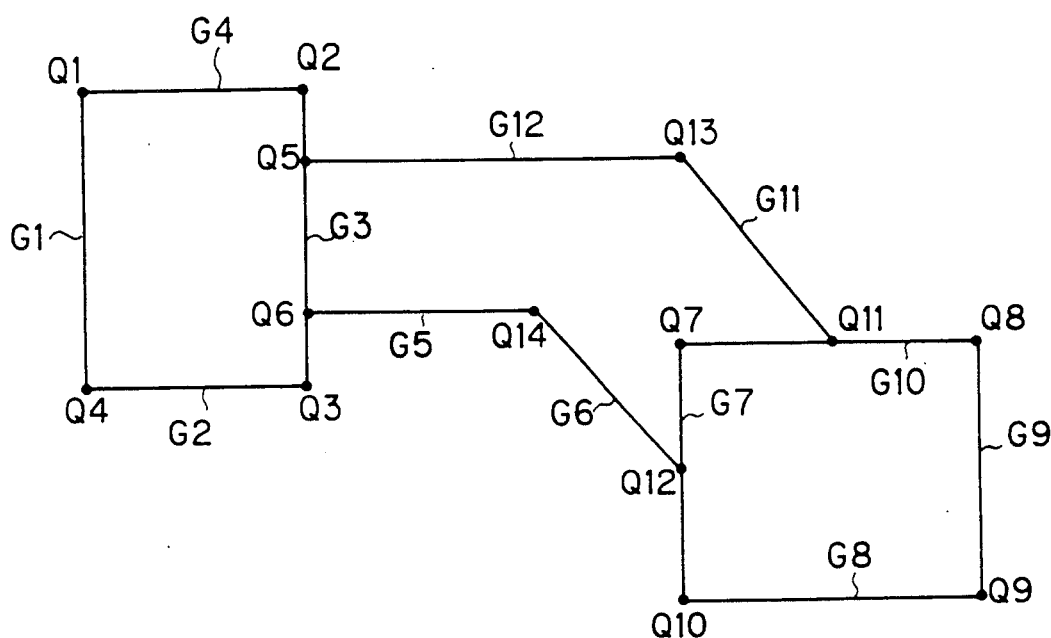
FIGS. 21(a)-(d) are an explanatory diagram showing a loop detection.
Figure 21B:
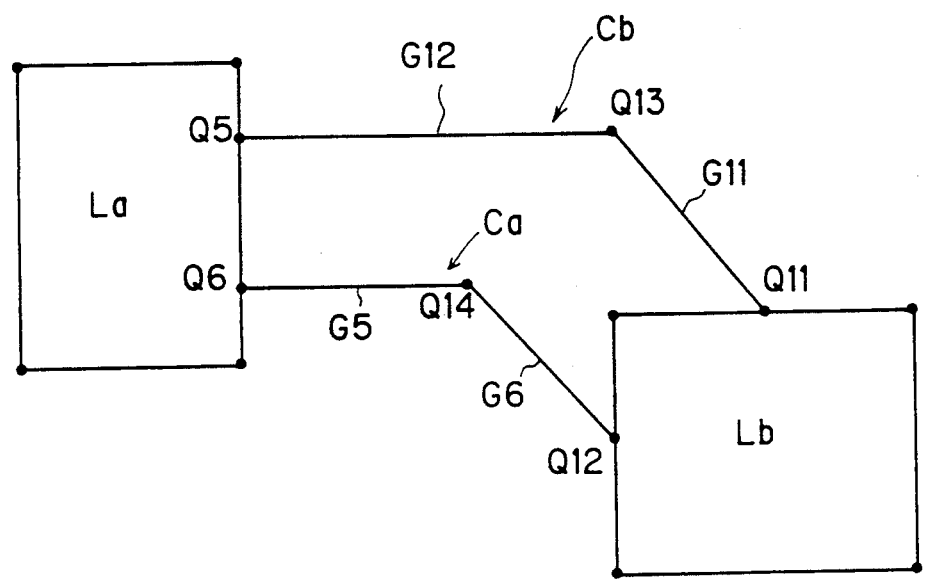

More particularly, a chain of segments not belonging to a fundamental loop is traced along the chain to detect "a loop linkage line" linking the points on one or mor fundamental loops with each other (process step S6b in FIG. 4B) Examples of a loop linkage line are illustrated in FIG. 21B as lines Ca and Cb.

Although the linkage line links the points on one or more fundamental loops with each other, a closed loop cannot be formed only by the linkage line. To obtain a closed loop, a plurality of linkage lines each of which links two fundamental loops together are combined with each other according to a predetermined combination rule (process step S6c in FIG. 4B).

The information with respect to the combined loop linkage lines is coupled with information as to a segment belonging to an already detected loop. Thus, a bridging loop including a connection mode other than the fundamental connection mode is found (process step S6d in FIG. 4B).

The original segment data were in the CAD system 10 so as to express a set of segments forming loops perfectly or imperfectly. Therefore, when detection of fundamental loops and bridging loops are completed, all segments have been used to detect the loops. After detection, both the fundamental loops and the bridging loops are subjected to the following processes as "loops" without discrimination therebetween. The data expressing the loop, which is obtained in the loop detection process, is called "loop data".

(e) Process of Generating Image Data for Filling

After detecting the loops, it is determined whether the inner region or the outer region of each loop should be filled The determination is made on the basis of the "inclusion relationship" between the loop under consideration and the other loops. The term "inclusion relationship" is defined as a relationship where one or more other loops are included or located in the inner region of the loop under consideration. The information indicating what region is to be filled is generated in this process, and it is added to the segment data for indicating which side of the segment is to be filled.

Figure 4B:
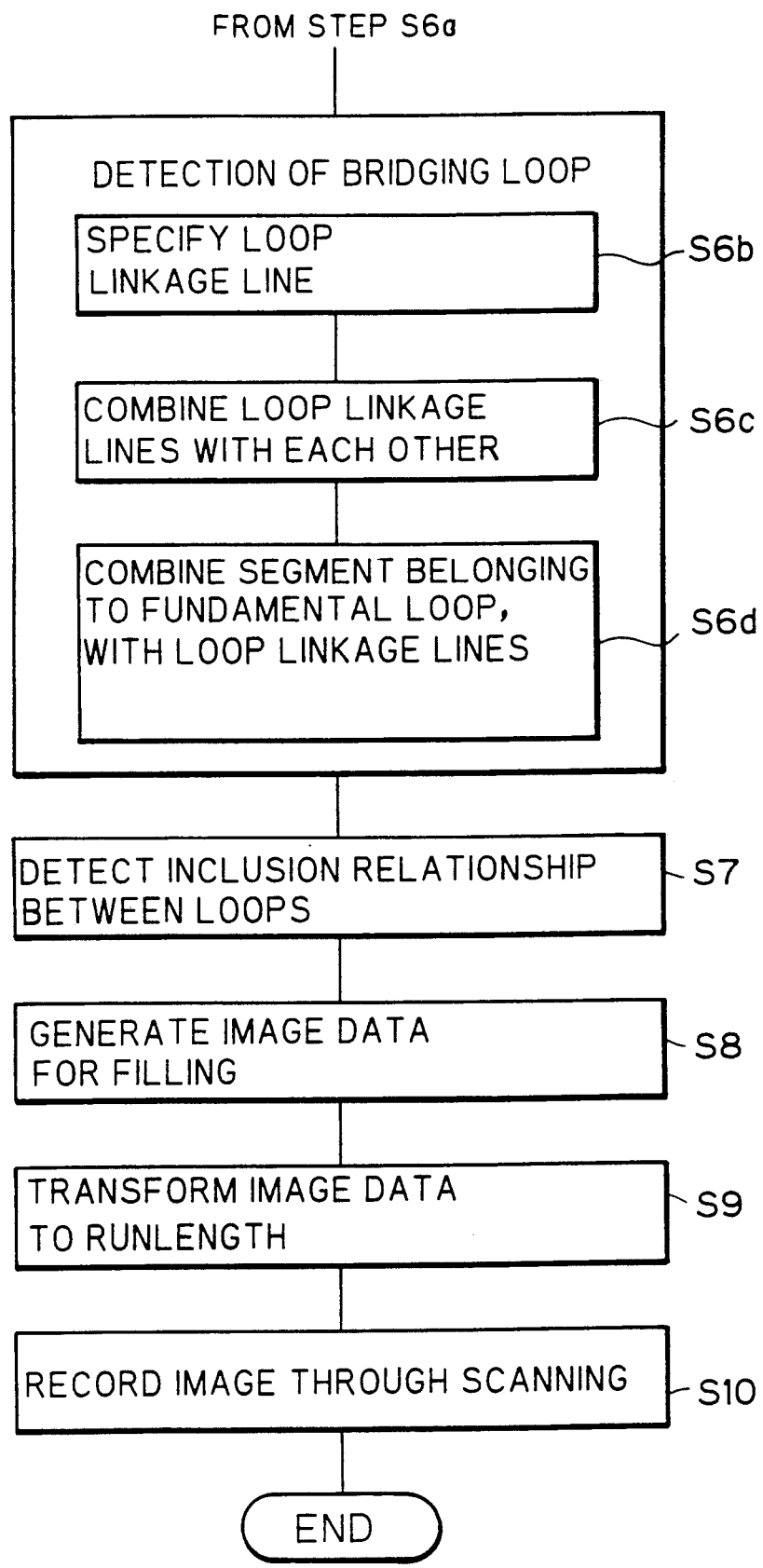

More particularly, the inclusion relationship between the loops is first detected (step S7 in FIG. 4B).

For example, the loop B–F in FIG. 3E is included in the loop A. Through the detection of the inclusion relationship, the regions to be filled can be determined. In the preferred embodiment, the information indicating a region to be filled is given to the segment data by resetting the direction of each segment so that the left side of each segment (with respect to the direction of the segment or vector) corresponds to a region to be filled.

Through this process, image data for filling is generated (process step S8 in FIG. 4B). Steps S2–S8 are carried out in the image data converter 20.

The image data obtained in the image data converter 20 are delivered to a laser plotter 30. The laser plotter 30 has a raster converter 31 for converting the image data into run-length data (process step S9). The run-length data is then transmitted to an interface circuit 32 which controls a laser beam generated in a laser oscillator 33 according to the run-length data. The control is ON/OFF control of the laser beam.

Figure 3H:
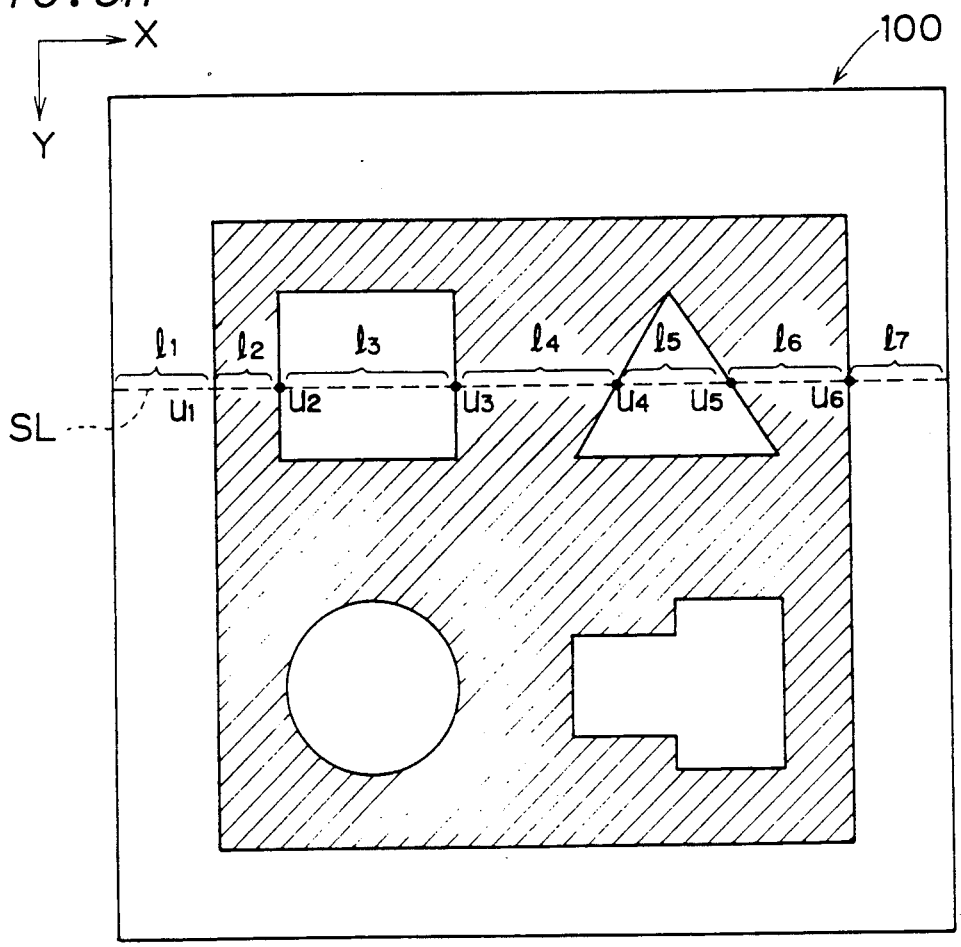

The laser beam is supplied to the photosensitive surface of a photosensitive film 34. The film 34 is wound around a rotary drum 35. The rotary drum 35 is rotated by a motor (not shown) in the direction α. The laser oscillator 33 is driven in the axial direction Y of the rotary drum 35. Therefore, by synchronizing the ON/OFF control of the laser beam with the rotation of the drum 35 and the movement of the laser oscillator 33, an image (as illustrated in FIG. 3H) is recorded on the photosensitive film 34 as an exposure pattern (process step S10 in FIG. 4B). Recording is along scanning lines in main scanning (X) and subscanning (Y) directions. Instead of a rotary drum type laser plotter, the laser plotter 30 may be a flat bed type, a stationary drum type in which the inner surface of the drum is scanned, or the like. The laser beam may consist of only one beam or it may consist of multi-beams.

The details of the system illustrated in FIG. 2 will be described in the following sections.

B. Details of Segment Classification Process

Referring to FIG. 3A, segment data Dseg (which are prepared in the CAD system 10) include information specifying the coordinates of the terminal points (start points and end points) of the segments a–t, as set forth in Table 1.

TABLE 1

| Segment | Segment Data $D_{seg}$ | |
|---|---|---|
| | Start Point | End Point |
| a | $a_S$ | $a_E$ |
| b | $b_S$ | $b_E$ |
| ... | ... | ... |
| s | $s_S$ | $s_E$ |
| t | (Center Point $t_0$, Radius $t_R$) | |

The coordinates of the start points, the end points and the central points are two dimensional coordinates (X, Y) defined on the image plane 100 (FIG. 3B).

The segment data $D_{seg}$ are stored in the memory 25. The CPU 24 then generates data expressing rectangular regions $R_a$–$R_t$ (FIG. 3B) (which include the segments a–t therein) on the basis of the segment data $D_{seg}$. For the rectangular region $R_r$, for example, the respective X coordinates $r_{SX}$ and $r_{SE}$ of the terminal points:

$$r_S = (r_{SX}, r_{SY}) \ldots \quad (1)$$

$$r_E = (r_{EX}, r_{EY}) \ldots \quad (2)$$

are compared to each other and the larger and smaller values are employed as a maximum value $r_{XMAX}$ and a minimum value $r_{XMIN}$, respectively. In the example of FIG. 3A:

$$r_{XMAX} = r_{SX} \ldots \quad (3)$$

$$r_{XMIN} = r_{EX} \ldots \quad (4)$$

minimum value $r_{YMIN}$ with respect to the Y coordinates are defined as:

$$r_{YMAX} = r_{EY} \ldots \quad (5)$$

$$r_{YMIN} = r_{SY} \ldots \quad (6)$$

Figure 5A:
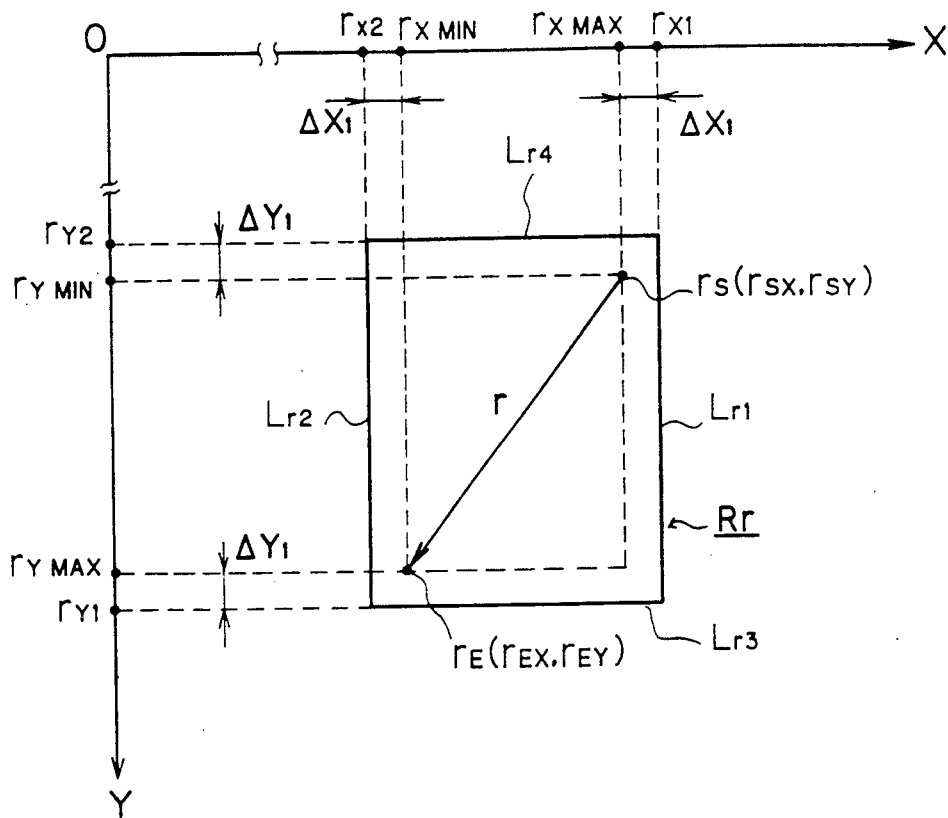
FIG. 5A and FIG. 5B are explanatory diagrams showing a rectangular approximation.

Then, values $r_{X1}$ and $r_{Y1}$ (which are larger than the maximum values $r_{XMAX}$ and $r_{XMIN}$ by $\Delta X_1$ and $\Delta Y_1$, respectively) are defined. The values $\Delta X_1$ and $\Delta Y_1$ are predetermined margins. Similarly, values $r_{X2}$ and $r_{Y2}$ are defined as being smaller than the minimum values $r_{X2}$ and $r_{Y2}$ by $\Delta X_1$ and $\Delta Y_1$, respectively. The values $rX_1$, $r_{X2}$, $r_{Y1}$ and $r_{Y2}$ are defined through the following expressions (7)–(10). The values are illustrated in FIG. 5A as points on the coordinate axes.

$$r_{X1} = r_{XMAX} + \Delta X_1 \ldots \quad (7)$$

$$r_{Y1} = r_{YMAX} + \Delta Y_1 \ldots \quad (8)$$

$$r_{X2} = r_{XMIN} - \Delta X_1 \ldots \quad (9)$$

$$r_{Y2} = r_{YMIN} - \Delta Y_1 \ldots \quad (10)$$

Figure 6:
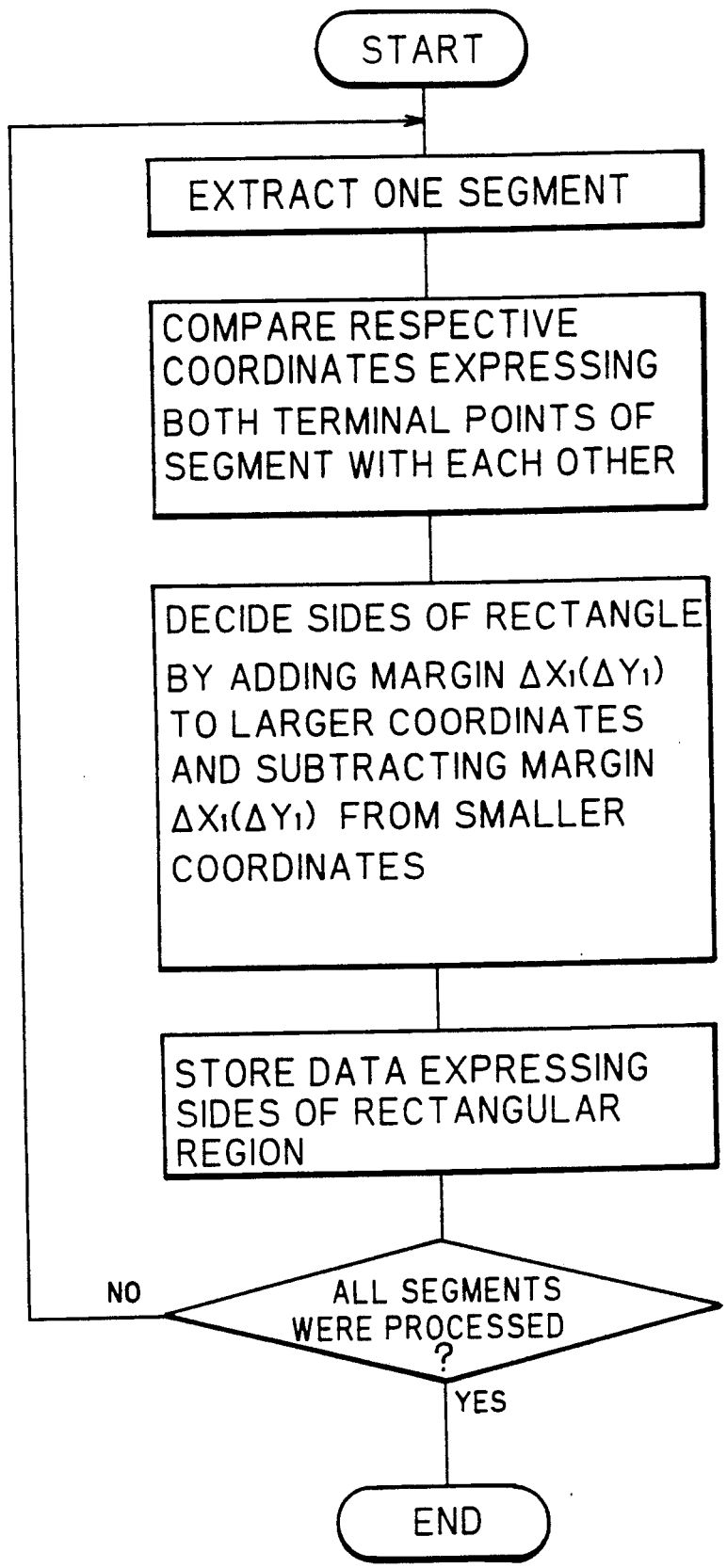
FIG. 6 is a flowchart showing a process of conducting the rectangular approximation.

Then, two lines which are parallel to the Y axis:

$$L_{r1}: X = r_{X1} \ldots \quad (11)$$

$$L_{r2}: X = r_{X2} \ldots \quad (12)$$

and two other lines which are parallel to the X axis:

$$L_{r3}: Y = r_{Y1} \ldots \quad (13)$$

$$L_{r4}: Y = r_{Y2} \ldots \quad (14)$$

are specified. The rectangular region $R_r$ for the segment r is defined as a region surrounded by the four lines or side $L_{r1}$–$L_{r4}$. The process is illustrated as a flowchart in FIG. 6.

Figure 5B:
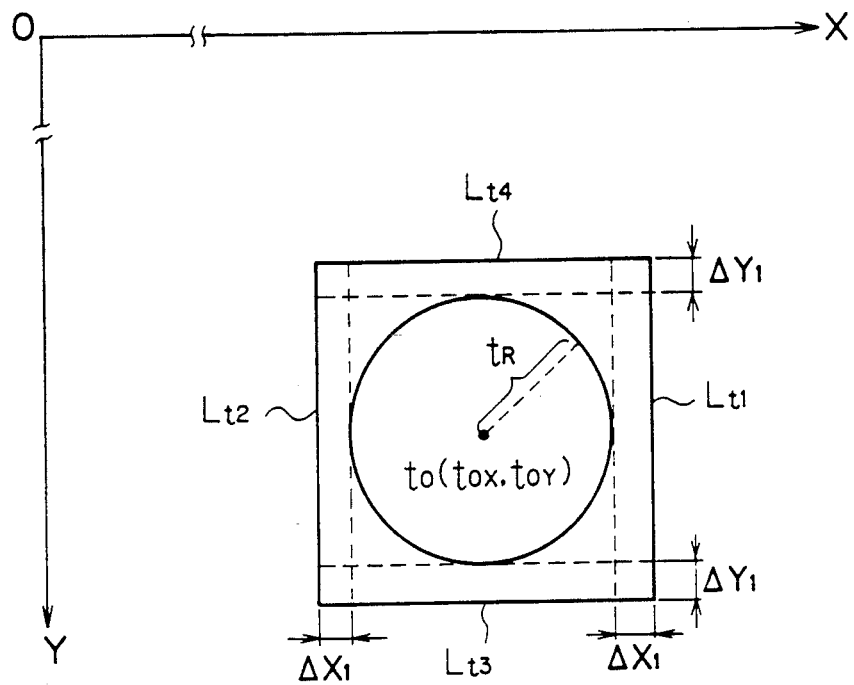

With respect to the segment (circle) t shown in FIG. 5B, the rectangular region $R_t$ is defined as a region whose contour is defined by the four lines $L_{t1}$–$L_{t4}$. The line $L_{t1}$–$L_{t4}$ are defined through the expressions (15)–(18), where ($t_{ox}$, $t_{oy}$) is a two dimensional coordinate of the central point t on the image plane.

$$L_{t1}: X = t_{0X} + t_R + \Delta X_1 \ldots \quad (15)$$

$$L_{t2}: X = t_{0X} - t_R - \Delta X_1 \ldots \quad (16)$$

$$L_{t3}: Y = t_{0y} + t_R + \Delta Y_1 \ldots \quad (17)$$

$$L_{t4}: Y = t_{0y} - t_R - \Delta Y_1 \ldots \quad (18)$$

The data expressing the rectangular regions $R_a R_t$ are stored in the memory 25.

After obtaining the rectangular regions $R_a$–$R_t$, each of the rectangular region $R_a$–$R_t$ are associated with an area in the image plane. Segment b is considered in the following example.

First, the image plane 100 shown in FIG. 3B is divided into four areas 110, 120, 130 and 140 by dividing the image plane 100 with one vertical line and one horizontal line. Then, a determination is made as to whether or not the rectangular region $R_b$ corresponding to the segment b is perfectly included in one of the areas 110–140. If the regi $R_b$ is included in one of the areas 110–140, an association is made between a particular area and the rectangular region $R_b$. In the example shown inl FIG. 3B, the rectangular regi $R_b$ is perfectly included in the area 120. The area 120 (which includes the rectangular region $R_b$) is further divided into four areas 121–124, and a determination is made as to whether or not the rectangular regi $R_b$ is included in one of the areas 121–124. As understood from FIG. 3B, none of the areas 121–124 perfectly includes the rectangular region $R_b$. Rather, the rectangular region $R_b$ extends over two of the areas 121 and 122.

When the term "minimum inclusion area" is defined so as to express an area which has a minimum size within the areas which perfectly include the rectangular region under consideration, the minimum inclusion area for the rectangular region $R_b$ is the region 120.

Figure 7A:
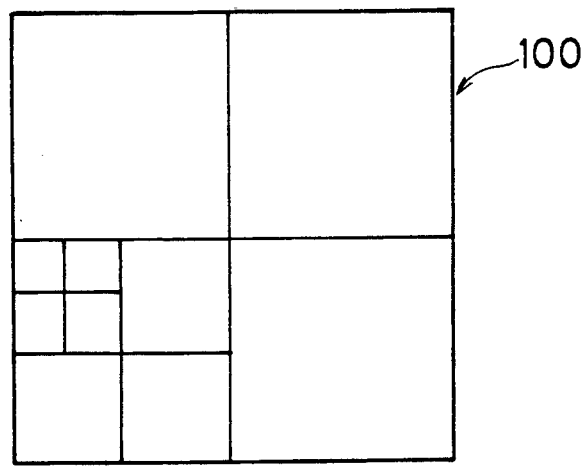
FIG. 7A through FIG. 7C are explanatory diagrams showing divisions of an image plane according to a quadruple branching classification method.

In general, for a given rectangular region, the image plane 100 is repeatedly divided into four areas, as shown in FIG. 7A. Then, for each repetition, inclusion relationships between the rectangular region and the areas are investigated. Thus, a minimum inclusion area corresponding to the rectangular region under consideration is determined. Since the rectangular region is defined so as to include a segment, the minimum inclusion area can be regarded as a divisional area which has a minimum size within the areas which include the segment. Rectangular regions or segments whose respective minimum inclusion areas are identical with each other are classified within the same class.

Figure 8:
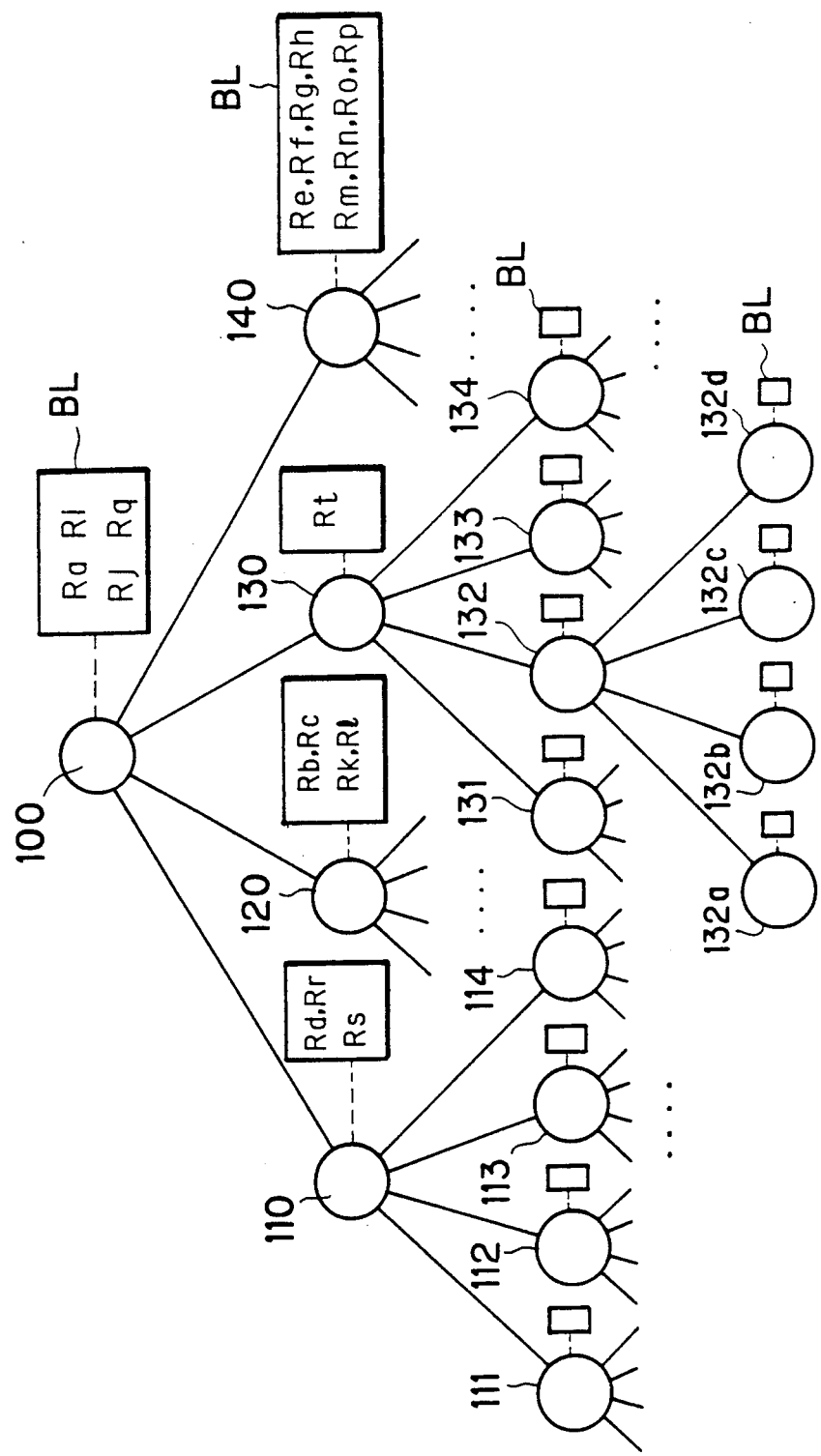
FIG. 8 is an explanatory diagram showing the quadruple branching method employed in a classification of segments.

The process will be understood more clearly with reference to the "classification tree" of FIG. 8. The tree is repeatedly branched into four branches from the "root" which is defined by the whole area corresponding to the image plane 100. In the first branching, four areas or "nodes" 110–140 are obtained. The second branching gives four sets of four areas 111–114, . . . , 131–134, . . . or secondary "nodes". (The secondary areas obtained from the areas 120 and 140 are not illustrated in FIG. 8.)

In theory, the branching can be repeated an infinite number of times However, in practice, the minimum inclusion area will be found after a finite number of repetitions since the segments are finite Therefore, in the preferred embodiment, the number of repetitions is previously determined so that the repetitions are stopped when areas smaller than a predetermined area are obtained. The minimum areas (areas 132a–132d in FIG. 8, for example) are called "leaves".

Considering the root, the nodes and the leaves as "nodes", all of the rectangular regions $R_a$–$R_t$ or the segments a–t are classified into their corresponding nodes. The nodes are the minimum inclusion areas associated with the rectangular region $R_a$–$R_t$ or the segments a–t.

For example, the rectangular region $R_b$ (as well as the corresponding segment b) belongs to the node 120 since the minimum inclusion area for the rectangular region $R_b$ is the divisional area 120. All of the rectangular regions $R_a$–$R_t$ are similarly classified. (The classification of the region $R_a$–$R_t$ is illustrated in the blocks BL of FIG. 8 in association with the respective nodes.) Data expressing the classified relationships between the rectangular regions $R_a$–$R_t$ (or the segments at) and the nodes are hereinafter referred to as "segment classification data". For the rectangular regions $R_a$–$R_t$, the nodes 110–140 are "leaves". The segment classification data $D_{SH}$ are stored in the memory 25 as illustrated in Table 2.

TABLE 2

| Segment Classification Data $D_{SM}$ | |
|---|---|
| Node | Segment |
| 100 | {a, i, j, q} |
| 110 | {d, r, s} |
| 120 | {b, c, k, l} |
| 130 | {t} |
| 140 | {e, f, g, h, m, n, o, p} |

Figure 9:
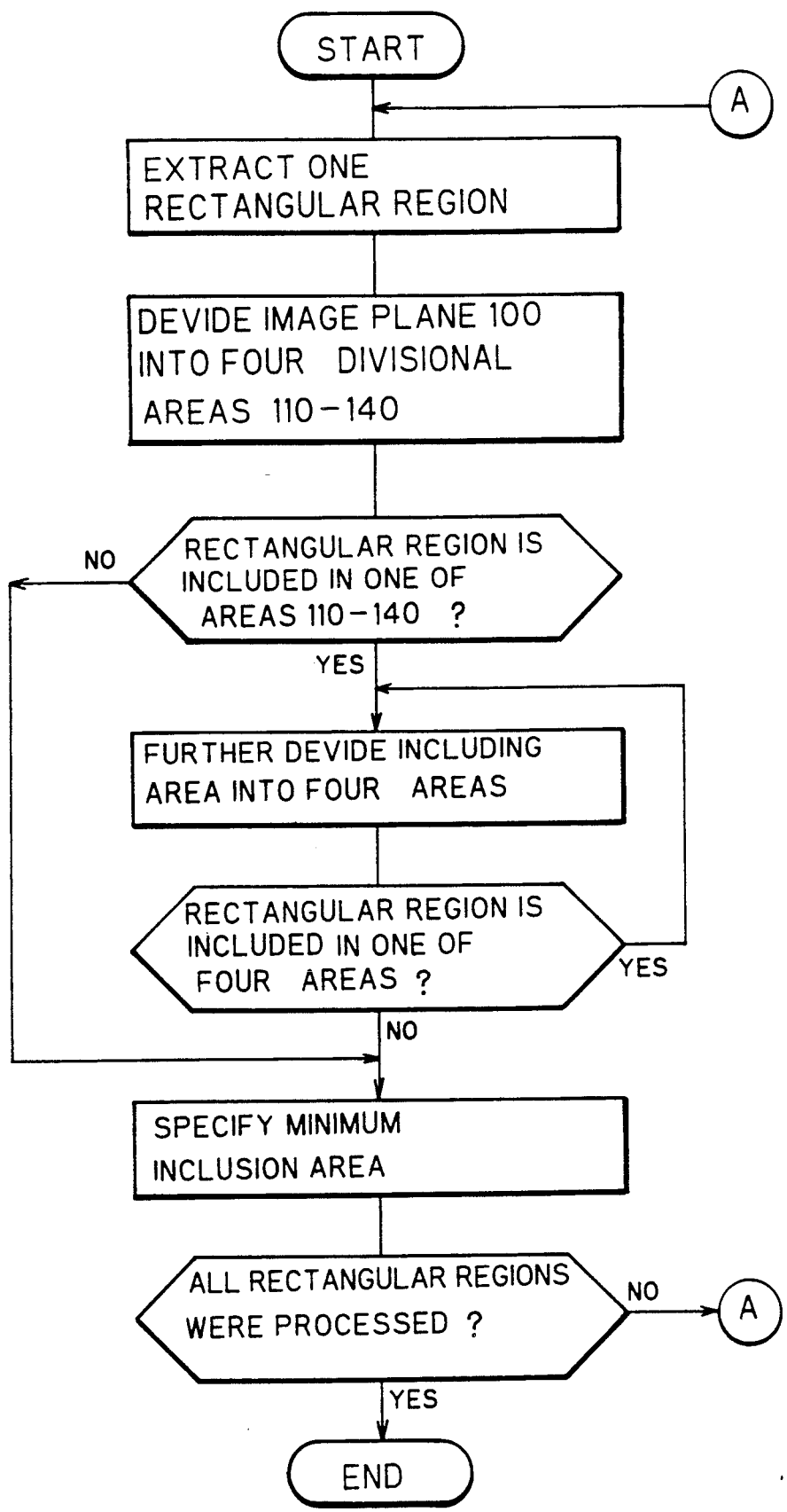
FIG. 9 is a flowchart showing a segment classification process employing the quadruple branching classification method.

The classification process is also illustrated as a flowchart in FIG. 9.

Through the classification, a determination is made as to which segments cannot be connected to each other. Within the nodes or the divisional areas shown in FIG. 8, two segments whose respective rectangular regions belong to direct nodes in the tree may be connected with each other. Two segments belonging to indirect nodes cannot be connected to each other. (Here, the term "direct nodes" is used by analogy to a family line or tree.) An example of segments whose rectangular regions belong to direct nodes is a pair of segments which belong to the node 100 and the node 110, respectively. An example of segments whose rectangular regions belong to indirect nodes is a pair of segments belonging to the nodes 110 and 120, respectively. Of course, two segments belonging to the same node may be connected to each other.

By means of the classification described above, the number of segment pairs to be subjected to the following connection mode detection process can be reduced In other words, only segment pairs which are surrounded by interrelated rectangles are subjected to connection mode detection. ("Interrelated rectangles" are rectangles belonging to divisional areas which overlap each other on the image plane.)

Figure 7B:
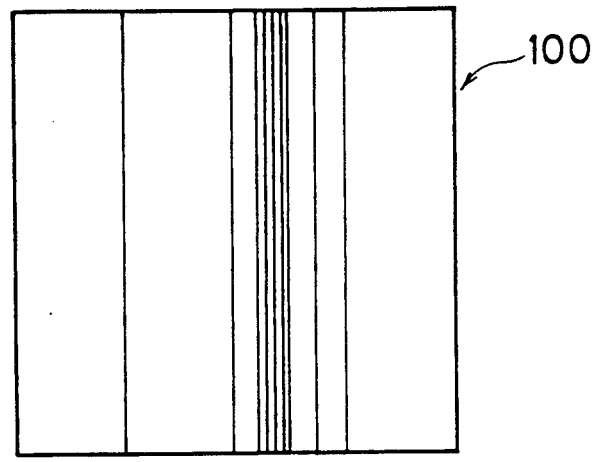
Figure 7C:
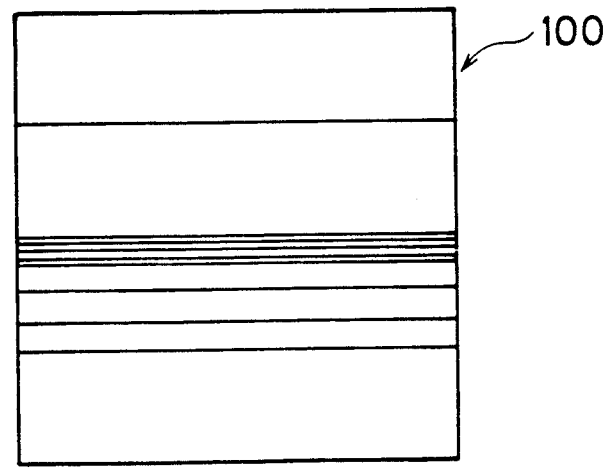

In the classification process, the margins $\Delta xhd\ 1$ and $\Delta y_1$ are introduced to prevent an erroneous determination that no connection exists when two segments are within adjacent divisional areas and are connected to each other at the boundary between the divisional areas. The quadruple branching classification may be carried out by repeatedly dividing the image plane into four divisional areas with only vertical division lines (FIG. 7B) or with only horizontal division lines (FIG. 7C). The former is especially suitable for a graphic figure having many vertical segments. The latter is suitable for a graphic figure having many horizontal segments In general, the number of branches employed for segment classification may be any positive integer which is equal to or greater than two.

C. Details of Segment Connection Mode Detection Process

In this process, mutual connection modes between the segments a-t are detected with reference to the segment classification data stored in the memory 25. In order to systematically carry out the detection, connection modes between segments are previously classified into plural types.

There are twelve types of connection modes A1-A4, B1-B5, and C1-C3 (FIGS. 10A to 10L). The mode A3 indicates the "fundamental connection mode" in which the terminal points of two segments are located at a common position. The other mode types are not fundamental connection modes. For example, mode A4 is a connection mode in which the terminal point of one segment is connected with another segment at a point other than the terminal points of the other segment. As understood from FIG. 10, the connection modes A1-A4 are connection modes between two line segments each of which has two terminal points, while the modes B1-B5 are connection modes for two segments one having two terminal points and the other being a closed segment, e.g., a circle. The remaining modes C1-C3 are for two closed segments.

The connection modes A1 and C1 are defined so as to include connection conditions in which the minimum distance $d_{is}$ between two segments satisfies the inequality (19) with respect to the predetermined gap margin $d_{max}$.

$$0 \mathrel{\mathop:}< d_{is} < d_{max} \quad\ldots \quad (19)$$

This is because such nearly connected segments should be regarded as connected segments The segments should be connected even though a small gap between the segments is introduced by a rough preparation of the segment data in the CAD system 10. In other words, only segments which are spaced apart from each other by a distance which is larger than the gap margin $d_{max}$ are treated as being not connected. In the preferred embodiment, the gap margin $d_{max}$ and the margins $\Delta X_1$ and $\Delta Y_1$ are identical to each other.

In generating the connection mode data, the characteristic point representing or characterizing the connection mode is specified for each connection between the segments. Each of the characteristic points in respective connection modes are shown in FIG. 10 as a black dot surrounded by a small circle. For the segments a-t shown in FIG. 3C, the connection modes between the segments a-t are detected and classified into connection mode types shown in FIG. 10. The detection process is carried out for the segments belonging to the same node and for the segments belonging to different nodes existing in the same direct line, where "direct line" means a straight series of branches 100, 130, 132 and 132a, for example. On the contrary, the segments belonging to different nodes of existing different branch lines or chains, e.g., the nodes 120 and 130, are not subjected to such detection. During the detection of the connection mode, a characteristic point with respect to each connection mode is also detected. This process is expressed in FIG. 11, as a flowchart, and the result of the detection is shown in Table 3. The "connection code" expresses the connection mode by a code system. However, in Table 3, the connection modes are indicated by the symbols A1-A4, . . . which have been used herein.

TABLE 3

| Pair of Segments | Connection Code | Characteristic Point |
|---|---|---|
| a-j | A3 | p1 |
| a-q | A2 | p2 |
| b-k | A3 | p6 |
| b-l | A3 | p7 |
| c-k | A3 | p8 |
| c-l | A3 | p9 |
| d-r | A3 | p10 |
| d-s | A3 | p11 |
| e-n | A3 | p13 |
| e-p | A3 | p14 |
| f-m | A3 | p15 |
| f-n | A2 | p16 |
| f-o | A3 | p17 |
| g-m | A3 | p18 |
| g-n | A2 | p19 |
| g-o | A3 | p20 |
| h-n | A3 | p21 |
| h-p | A3 | p22 |
| i-j | A4 | p3 |
| i-q | A1 | p4, p5 |
| r-s | A3 | p12 |

On the basis of the result shown in Table 3, connection mode data $D_{CR}$ shown in Table 4 is generated in the CPU 24. In Table 4, "related segment" means segment which is connected to the segment indicated in the first column. "Number of related segments" means the number of related segments. The "serial number of related segment" is an address at which the related segment is stored in the memory 25. The "characteristic point data" consists of the coordinat $P_n$ of the characteristic point and "terminal point flag $F_C$" indicates the positional relationship between the terminal point of the related segment and the segment in the first column. The terminal point flag $F_C$ indicates the positional relationship according to the rule shown in Table 5.

TABLE 4

| Connection Mode Data $D_{CR}$ | | | | |
|---|---|---|---|---|
| NS = Name of Segment | | | | |
| NBR = Number of Related Segments | | | | |
| NRS = Serial Number of Related Segment | | | | |
| CC = Connection Code | | | | |
| DC = Characteristic Point Data | | | | |
| NS | NBR | NRS | CC | DC |
| a | 2 | j | A3 | p1 (F1) |
|  |  | q | A2 | p2 (F3) |
| b | 2 | k | A3 | p6 (F2) |
|  |  | l | A3 | p7 (F1) |
| c | 2 | k | A3 | p8 (F2) |
|  |  | l | A3 | p9 (F2) |
| d | 2 | r | A3 | p10 (F1) |

TABLE 4-continued

| | | Connection Mode Data $D_{CR}$ | | |
|---|---|---|---|---|
| | | s | A3 | p11 (F2) |
| e | 2 | n | A3 | p13 (F1) |
| | | p | A3 | p14 (F2) |
| f | 3 | m | A3 | p15 (F1) |
| | | n | A2 | p16 (F3) |
| | | o | A3 | p17 (F2) |
| g | 3 | m | A3 | p18 (F2) |
| | | n | A2 | p19 (F3) |
| | | o | A3 | p20 (F1) |
| h | 2 | n | A3 | p21 (F2) |
| | | p | A3 | p22 (F1) |
| i | 2 | j | A4 | p3 (F4) |
| | | q | A1 | p4 (F4) |
| | | | | p5 (F3) |
| j | 2 | a | A3 | p1 (F1) |
| | | i | A4 | p3 (F3) |
| k | 2 | b | A3 | p6 (F2) |
| | | c | A3 | p8 (F1) |
| l | 2 | b | A3 | p7 (F1) |
| | | c | A3 | p9 (F2) |
| m | 2 | f | A3 | p15 (F1) |
| | | g | A3 | p18 (F2) |
| n | 4 | e | A3 | p13 (F1) |
| | | f | A2 | p16 (F3) |
| | | g | A2 | p19 (F3) |
| | | h | A3 | p21 (F2) |
| o | 2 | f | A3 | p17 (F2) |
| | | g | A3 | p20 (F1) |
| p | 2 | e | A3 | p14 (F2) |
| | | h | A3 | p22 (F1) |
| q | 2 | a | A2 | p2 (F3) |
| | | i | A1 | p4 (F2) |
| | | | | p5 (F4) |
| r | 2 | d | A3 | p10 (F2) |
| | | s | A3 | p12 (F1) |
| s | 2 | r | A3 | p12 (F1) |
| | | d | A3 | p11 (F2) |
| t | 0 | — | — | — |

TABLE 5

| | Terminal Point Flag $F_C$ |
|---|---|
| $F_C$ | Contents |
| F1 | The character point is the start point of the segment. |
| F2 | The character point is the end point of the segment. |
| F3 | The character point is located on the segment. |
| F4 | The character point is located out of the segment. |

The connection mode data $D_{CR}$ are stored in the memory 25 as a data base where the relationship between the data included therein can be easily accessed. Therefore, the relationship between the data illustrated in the respective columns in Table 4 is easily determined and the connection mode data $D_{CR}$ can be arbitrarily read and corrected in the following processes.

D. Detail of Terminal Point Correction Phases

Figure 12A:
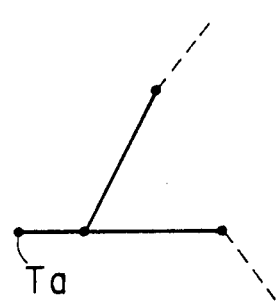
FIGS. 12(a)-(b) are an explanatory diagram of a terminal correction.
Figure 12B:
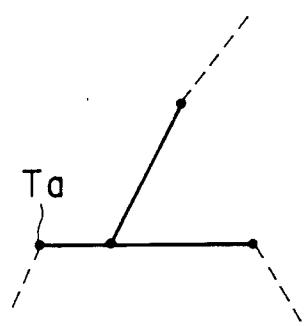

Then, the CPU 24 corrects a pair of segments which are in an imperfect connection mode so as to be segments in a perfect connection mode A3 or B2. A segment having no floating terminal point such as a segment in mode C1, C2 or C3 is not subjected to correction. Therefore, the segments to be corrected are only those in one of the seven connection modes A1, A2 (A4), B1, B3, B4 and B5. As to the connection mode A4, the correction is carried out only for the segment connected with another segment having a floating terminal point Ta as shown in FIG. 12A, since it is not necessary to correct the segment when the terminal point $T_b$ (FIG. 12B) of the other segment connected therewith has no floating terminal point.

Figure 13A:
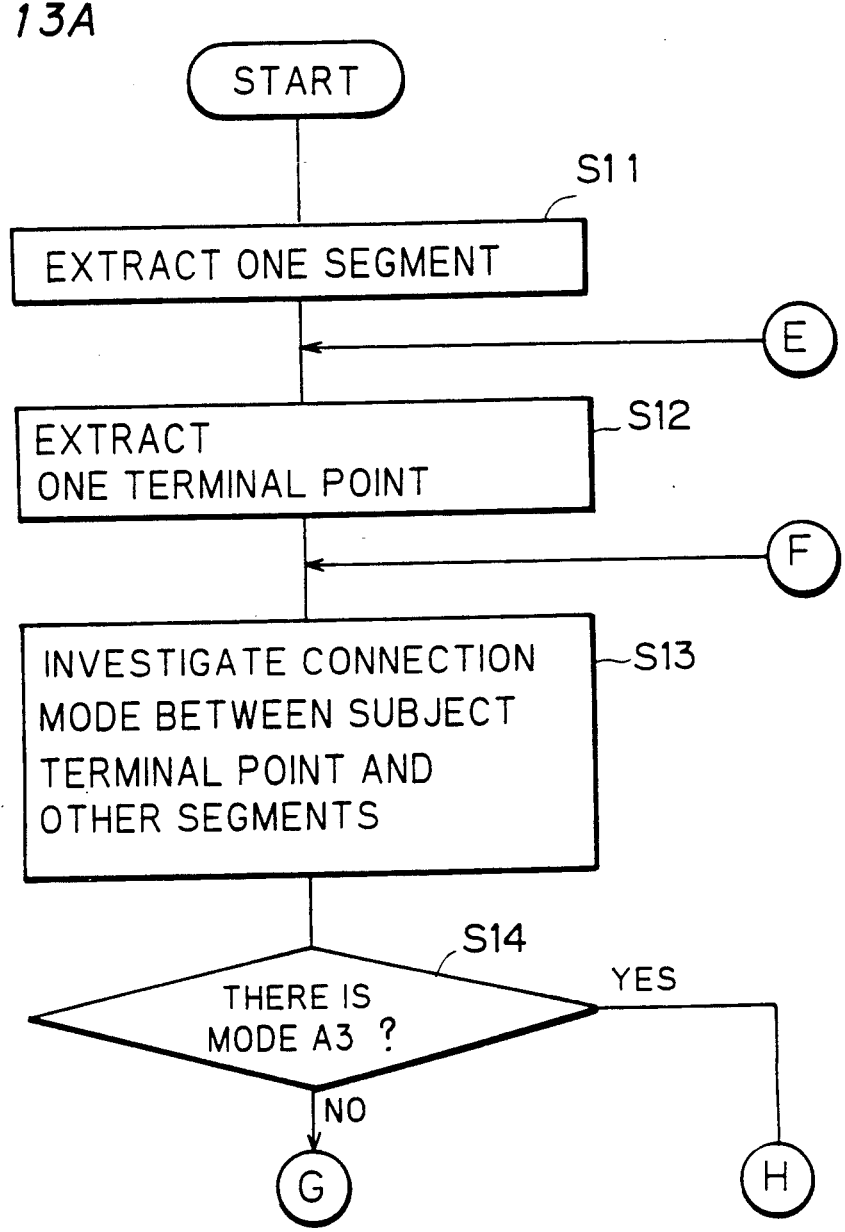
Figure 13B:
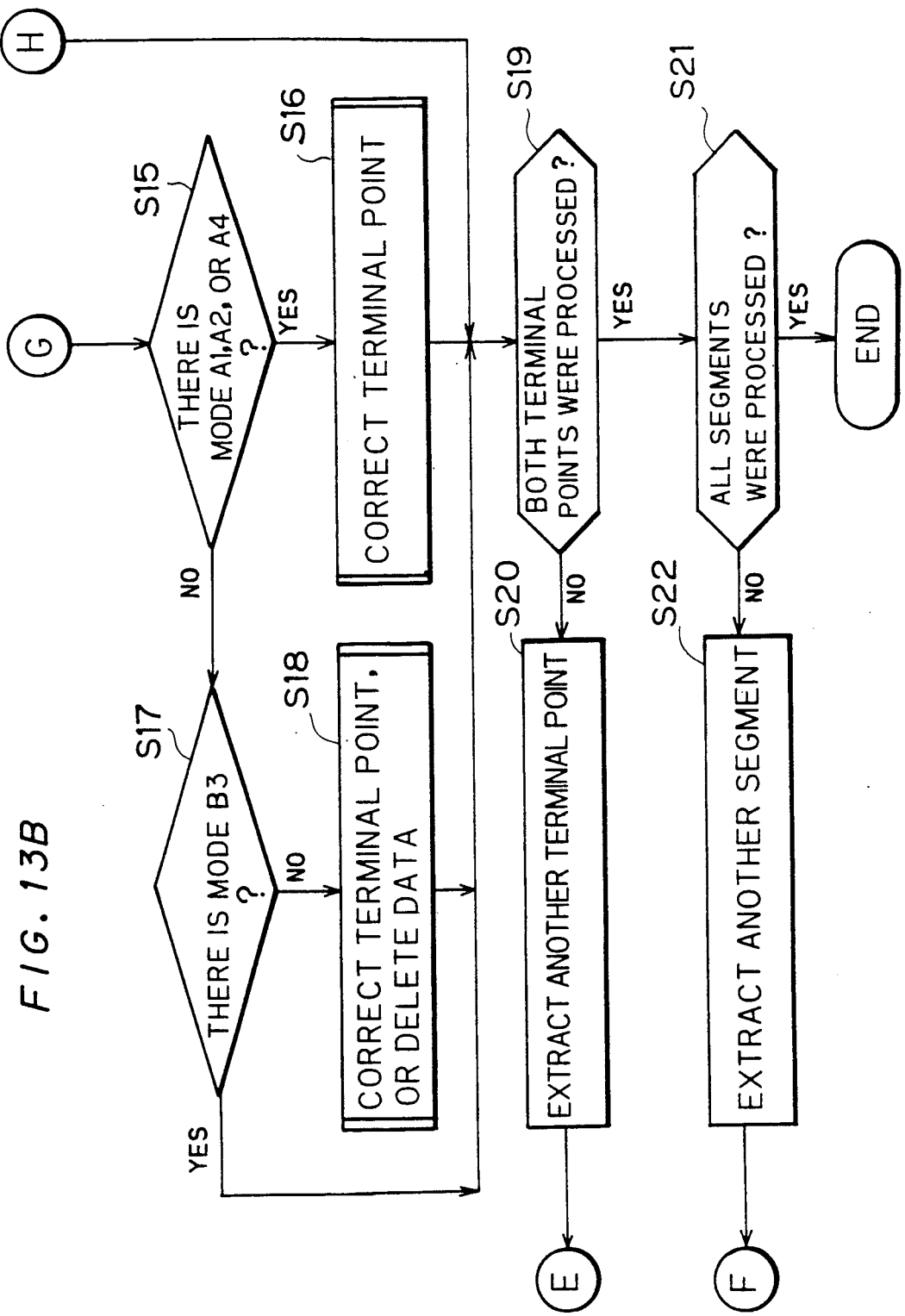

The correction process is illustrated in FIG. 13. In FIG. 13, a segment is selected, and one of the terminal points of the selected segment is selected. Then, the connection mode between the selected terminal point and another segment is determined with reference to the connection mode data (process steps S11-S13). When the terminal point is connected with another segment in the mode A3, which is the fundamental and perfect connection mode, the process progresses to steps S19 and S20, and then returns to step S12. Namely, the terminal point is not subjected to correction, and the other terminal point is selected to be subjected to steps S11-S13.

On the other hand, when it is determined (in process step S14) that the terminal point is not connected with another segment in the connection mode A3, it is determined whether or not the terminal point is connected with another segment in the connection mode A1, A2 or A4 (process step S15) When the terminal point is connected in the connection mode A1, A2 or A4, the terminal point is corrected so as to be connected with the other segment in the perfect connection mode (process step S16, details of which will be described later) If it is determined during process step S15 that the terminal point is not connected with another segment in connection mode A1, A2 nor A4, it is determined (in process step S17) whether or not the terminal point is connected with another segment in the connection mode B2. When a connection in the connection mode B2 is found, the terminal point is not subjected to correction in process step S18 since mode B2 is one of the perfect connection modes. On the other hand, if a connection in the mode B2 is not found, it can be concluded that the terminal point is connected with another segment in the mode B1, B3, B4 or B5. This is because the modes C1-C3 are out of consideration since a "terminal point" cannot be defined for a circle. In process step S18, the terminal point in the mode B1, B3, B4 or B5 is corrected so as to be in the mode B2, or the data expressing the terminal point is deleted from the data base. Details of the process step S18 will also be described later. Through the process steps S19-S20, such a routine is repeated for the terminal points of all segments.

Figure 14A:
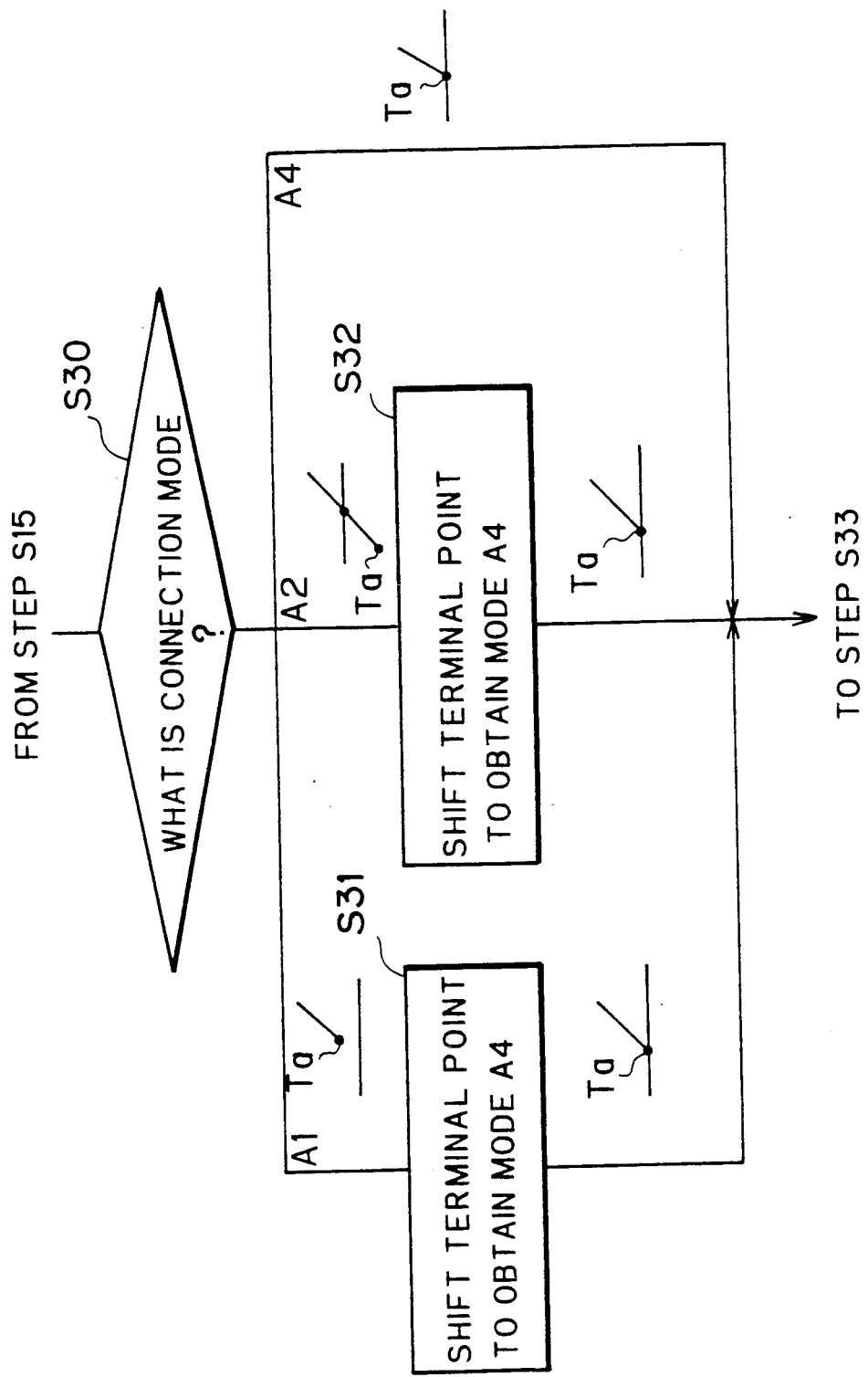
Figure 14B:
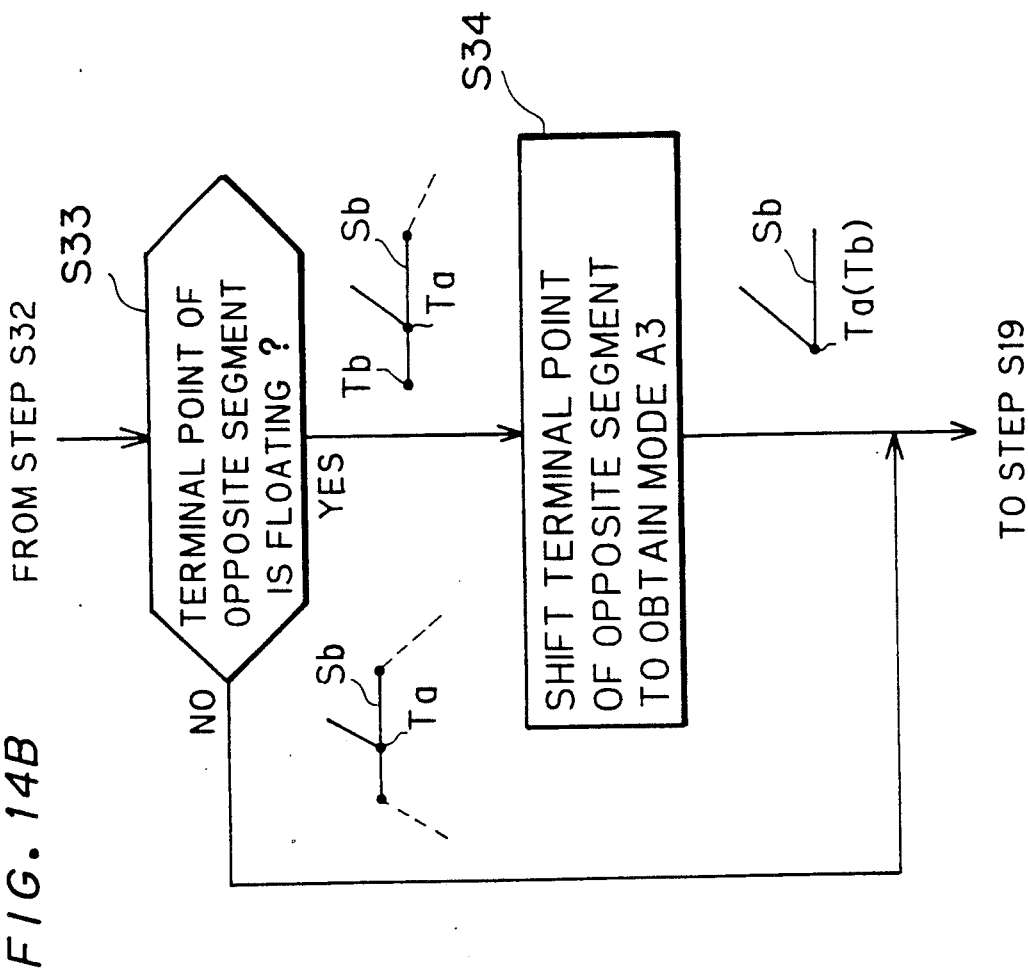

FIG. 14A and FIG. 14B are flowcharts illustrating details of the process step S16 in FIG. 13. In process step S30, a determination is made as to which mode within the modes A1, A2 and A4 the subjected terminal point is connected to another segment. When in mode A1 or A2, the terminal point $T_a$ is corrected so as to be connected to the other segment $S_b$ (process steps S31 and S32). The correction is executed through correction of the connection mode data and the coordinate value of the terminal point included in the segment data Through the correction, the terminal point in the mode A1 or A2 is preliminarily converted into that in the mode A4. When the connection mode of the terminal point is originally in mode A4, no correction is executed and mode A4 is reserved.

Then, a determination is made (in process step S33) whether or not the terminal poin $T_b$ of the other segment $S_b$ is a floating terminal point. When it is a floating terminal point, the terminal poin $T_b$ is shifted to the corrected poin $T_a$, to obtain the connection mode A3 (process step S34). If the terminal point $T_b$ is not a floating terminal point, the correction or shift of the terminal poin $T_b$ is not required.

FIG. 14C is a flowchart illustrating details of process step S18 (FIG. 13). When the connection mode is the mode B1 or B3, the terminal point $T_a$ is so shifted that the connection mode thereof is converted into the mode B2. If the connection mode of the terminal point $T_a$ is the mode B4 or B5, the data respecting the segment $S_a$ is deleted from the connection mode data and the segment data. This is because the modes B4 and B5 are not appropriate for constructing a closed loop, as seen from FIG. 10, and it can be determined that the segment having the mode B4 or B5 was prepared by mistake With respect to the segments a-t in FIG. 3C, the above indicated process is conducted as follows First, it should be noted that the seven segments a, g, i, j, f, q, and n are in imperfect connection modes since each of the seven segments has a connection mode other than the connection modes A3 and B2 (as indicated by the connection mode data $D_{CR}$ in Table 4).

Figure 15A:
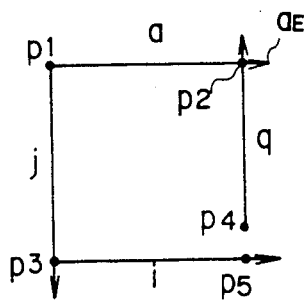

As to the segment a, it is determined from Table 4 that its connection with the segment g is "imperfect", and the position of the terminal point $a_E$ shown in FIG. 15A is corrected to the position of the character point p2, through process step S32 (FIG. 14A). More particularly, in the row having NS=a and NRS=q in the connection mode data $D_{CR}$ (Table 4), the connection code A2 is rewritten to A4, and the terminal point flag with respect to the characteristic point p2 is rewritten to "F2" indicating an end point. Therefore, within the connection mode data for the segment a, the data:
"q A2 p2 (F3)"
is rewritten to:
"q A4 p2 (F4)"
and, correspondingly, the connection mode data for the segment q is rewritten from:
"a A2 p2 (F3)"
to:
"a A4 p2 (F3)"

Figure 15B:
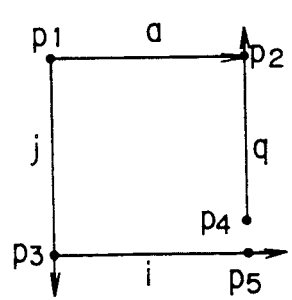

During or subsequent to the rewrite processes, the coordinate value of the terminal point $a_E$ of the segment a, which is included in the segment data, is rewritten as the characteristic point p2. The state thus obtained is shown in FIG. 15B.

Figure 15C:
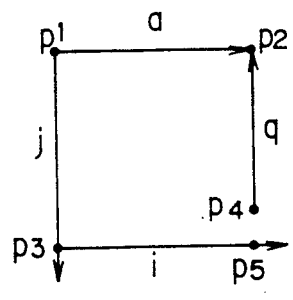

Next, the data for the characteristic point q included in the connection mode data with respect to the segment q is rewritten from
"a A4 p2 (F3)"
to
"a A3 p2 (F3)"
through the process steps S32 and S33, so that the connection mode in which the segments a and q are interconnected at the characteristic point p2 is corrected to the "perfect connection mode" (FIG. 15C).

Figure 15D:
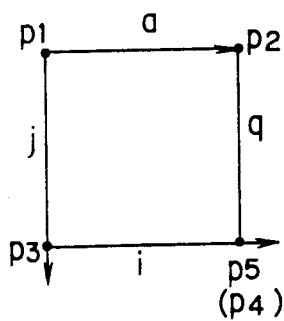
Figure 15E:
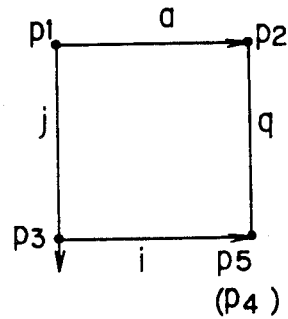
Figure 15F:
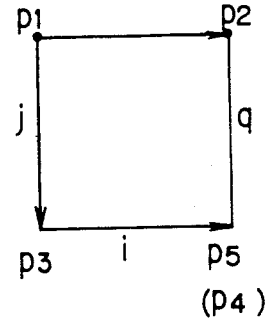

Similarly, the respective connection modes between the segments q and i, and that between the segments i and j are corrected through the process illustrated in FIG. 15D through FIG. 15F. As a result, the corrected connection mode data for the segments a, q, i and j are obtained as illustrated in Table 6.

TABLE 6

| NS | NBR | NRS | CC | DC |
|----|-----|-----|----|----|
| a  | 2   | j   | A3 | p1 (F1) |
|    |     | q   | A3 | p2 (F2) |
| i  | 2   | j   | A3 | p3 (F2) |
|    |     | q   | A3 | p5 (F1) |
| j  | 2   | a   | A3 | p1 (F1) |
|    |     | i   | A3 | p3 (F2) |
| 1  | 2   | a   | A3 | p2 (F1) |

TABLE 6-continued

| NS | NBR | NRS | CC | DC |
|----|-----|-----|----|----|
|    |     | i   | A3 | p5 (F2) |

In Table 6, the data with respect to the characteristic point p4 is not present, since the characteristic points p4 and p5 coincide with each other after correction.

Figure 16A:
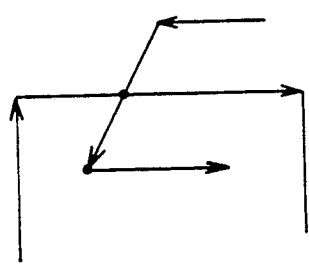
Figure 16B:
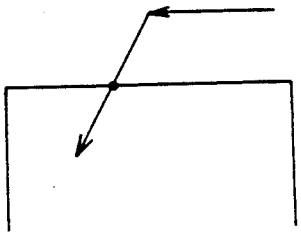

As illustrated in Table 4, the connection mode A2 belonging to the "imperfect connection mode" exists also in the segment data for segments f, q and n. However, the segment data for these segments are not subjected to the correction process, since each of the respective opposite segments to which the segments f, q and n are connected in the mode A2 has terminal points connected to other segments, respectively. For example, the segment f shown in FIG. 3C is connected to the segment n at the characteristic point p16 in the connection mode A2. However, the connection mode data for the segment f is not corrected because the terminal points of the segment f connect to the segments e and h, respectively. If the connection is as illustrated in FIG. 16B rather than that shown in FIG. 16A, then correction is required In other words, a connection mode data for a segment being connected to another segment in the connection mode A2 is corrected only when the latter segment has a floating terminal point The routine for judging whether mode data in the connection mode A2 should be corrected or not occurs during process step S32 (FIG. 14A).

Figure 10A:
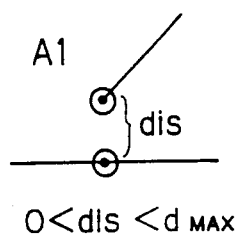
FIGS. 10(a)-(l) are an explanatory diagram showing connection modes and connection codes.
Figure 10B:
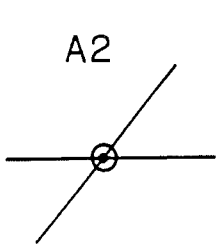
Figure 10C:
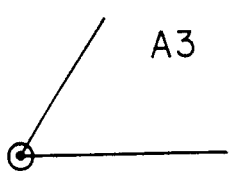
Figure 10D:
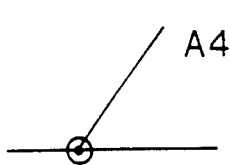
Figure 10E:
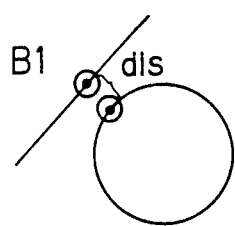
Figure 10F:
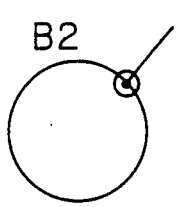
Figure 10G:
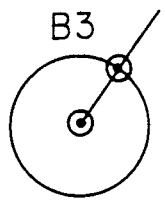
Figure 10H:
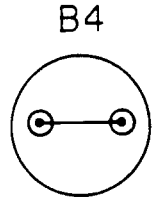
Figure 10I:
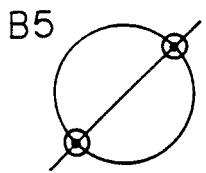
Figure 10J:
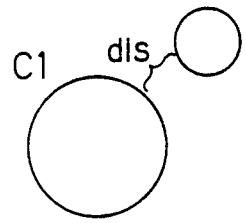
Figure 10K:
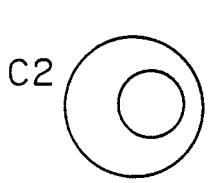
Figure 10L:
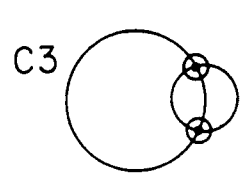
Figure 11A:
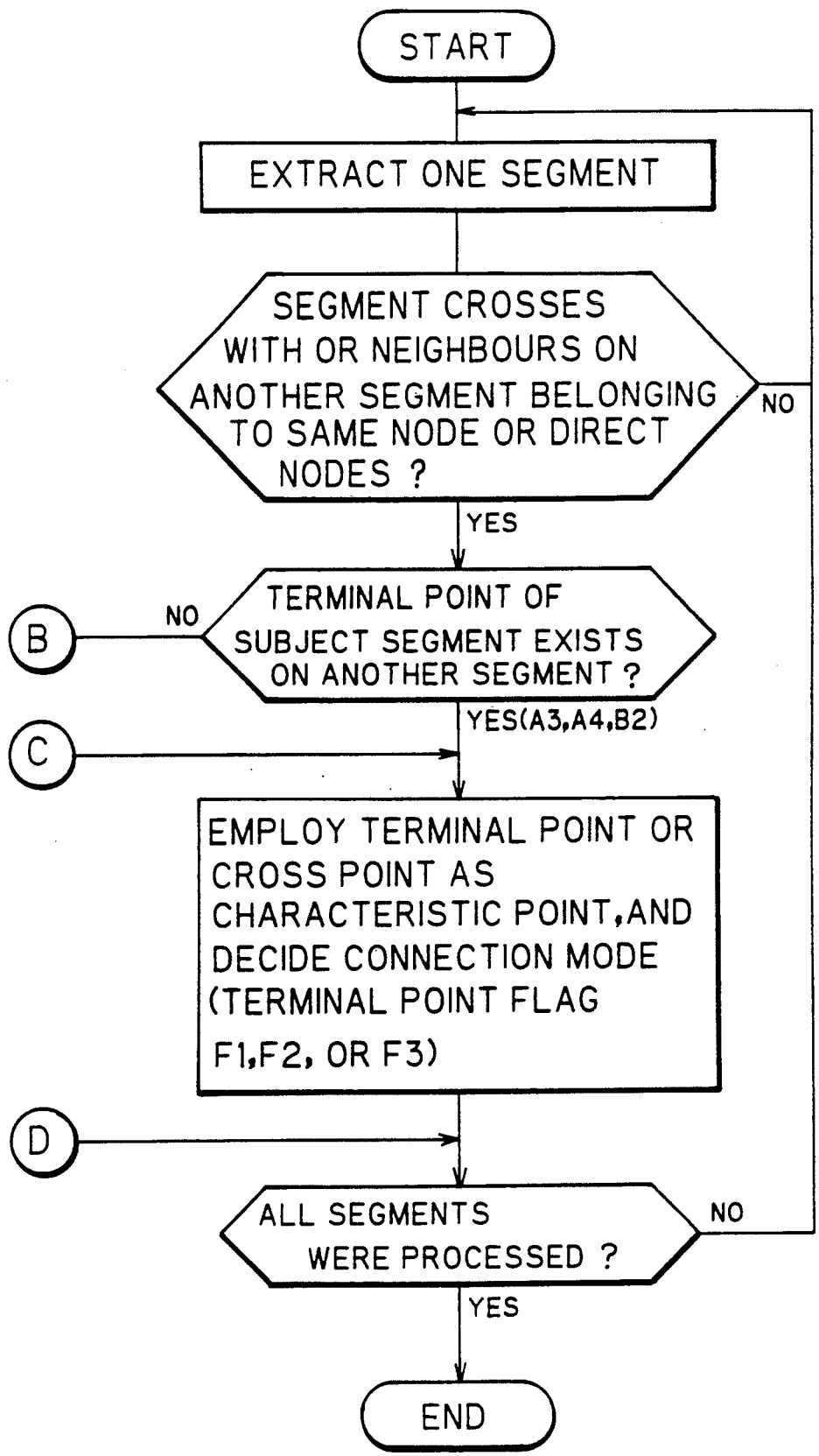
FIGS. 11(a)-(b) are a flowchart showing a connection mode data generation process.
Figure 11B:
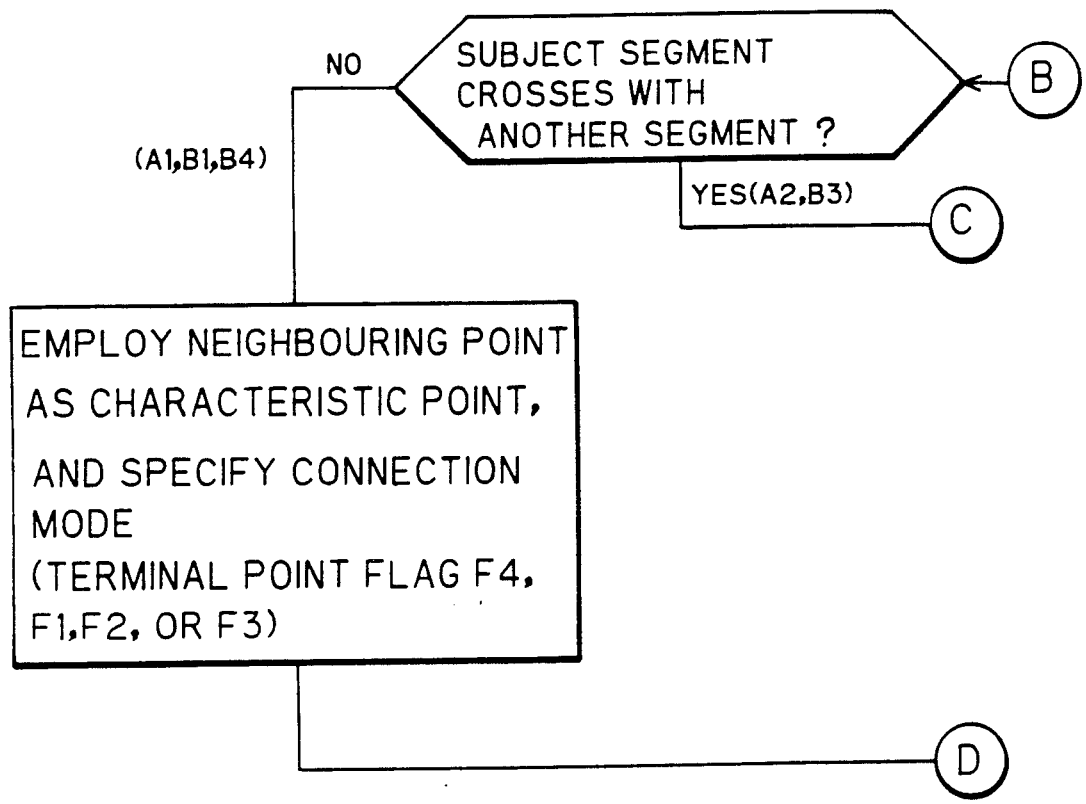
Figure 17A:
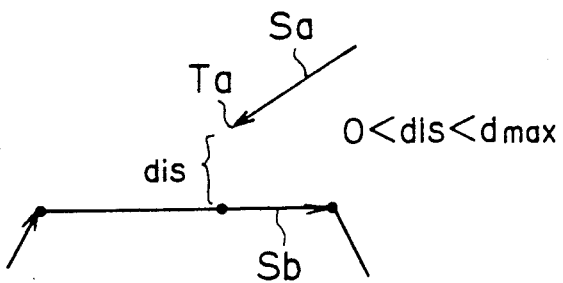
Figure 17B:
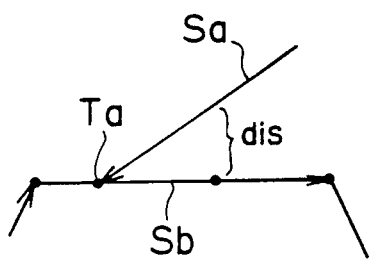
Figure 17C:
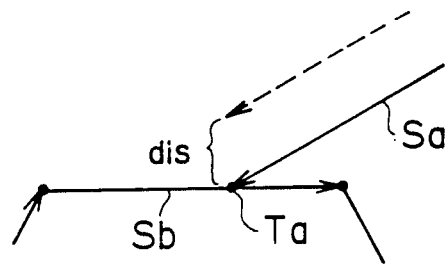
Figure 17D:
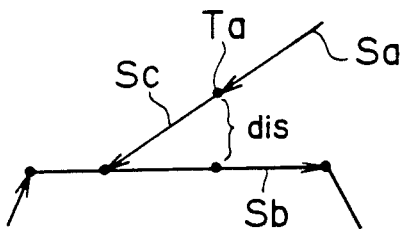
Figure 17E:
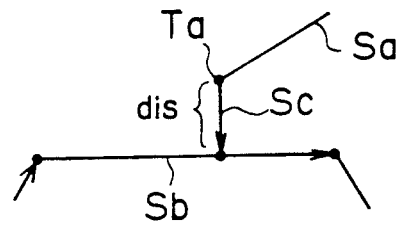

With respect to the connection mode A1 shown in FIG. 10A, correction can be carried out through one of several procedures. For example, when the segment $S_a$ and $S_b$ shown in FIG. 17A are imperfectly interconnected in the connection mode A1, the terminal point $T_a$ may be corrected through an extension of the segment $S_a$ as illustrated in FIG. 17B, or alternatively through a translationaal shift of the segment $S_a$ as illustrated in FIG. 17C. A new segment Sc (FIG. 17D or FIG. 17E) may be added to segment $S_a$, in place of the procedures illustrated in FIGS. 17B and 17C.

Figure 18A:
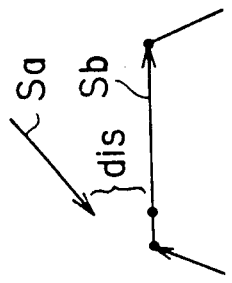
Figure 18B:
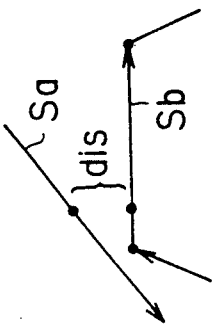
Figure 18C:
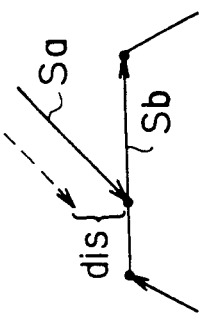

In the preferred embodiment, one of the procedures is selected according to the type of positional relationship between the segments $S_a$ and $S_b$. If the positional relationship is as illustrated in FIG. 18A, for example, the procedure illustrated in FIG. 17B is not suitable for correction since the perfect condition mode will not be obtained thereby as illustrated in FIG. 18B. In such a case, the procedure illustrated in FIG. 17C can be used because the perfect connection mode shown in FIG. 18C can be obtained thereby On the other hand, if the positional relationship is not as illustrated in FIG. 18A, the perfect connection mode is obtained by shifting the terminal point Through the correction process, a set of segments (FIG. 3D), each of which have no "floating terminal point", is obtained.

E. Detail of Loop Detection Process

After the connection mode data and the segment data illustrated in FIG. 3D are obtained, loops are detected. Since the connection mode data include all of the information with respect to interconnections between segments, all of the loops can be detected through a process wherein a chain of a segment is traced from an arbitrary segment. However, when the segment data are prepared in the CAD system 10 (such as those used with a cutting machine), graphic figures (as illustrated in FIG. 19A, for example) are often expressed by a set of linked loops $L_a$, $L_b$ and $L_c$ (FIG. 19C) rather than a single or independent loop (FIG. 19B). Therefore, when the basic tracing method described above is employed in the loop detection process, a relatively long time is required to detect all of the loops. Accordingly, the following improved detection process is employed in the preferred embodiment to detect the loops at a high efficiency and a high speed.

Figure 20:
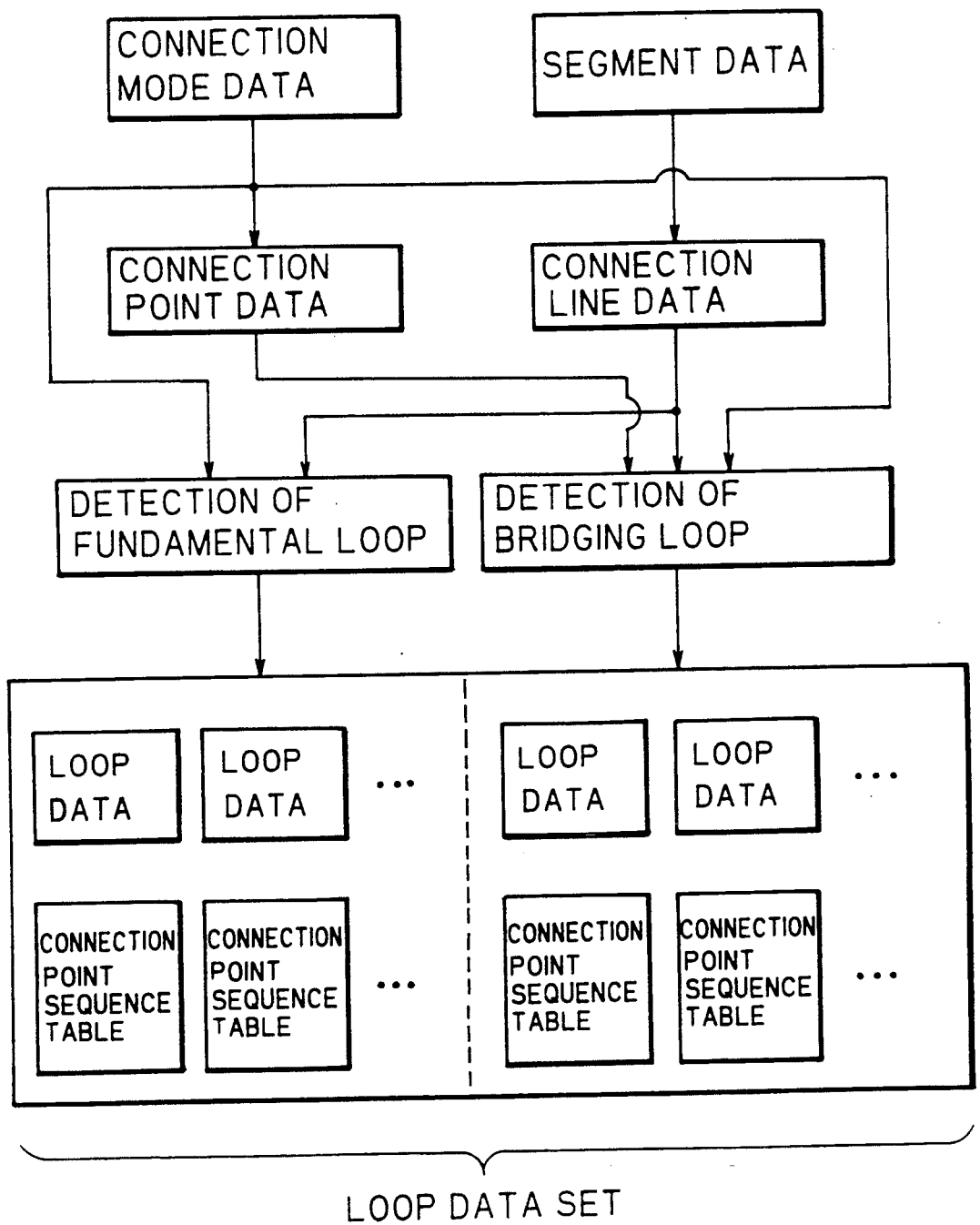
FIG. 20 is a schematic block diagram showing a loop data generation process.

In the improved detection process schematically illustrated in FIG. 20, "connection point data" is first obtained based on the connection mode data (after subjected to terminal point correction). The connection point data consists of the two dimensional coordinates of a connection point, and information indicating two segments interconnected at the connection point. The "connection point" corresponds to the "characteristic point" indicated in the connection mode data. The connection point data is used to determine which segments are interconnected at a connection point.

For example, the connection point data with respect to the connection point Q1 in FIG. 21A is obtained as illustrated in Table 7, where the graphic figure illustrated in FIG. 21A corresponds to that in FIG. 19C except for the difference in size, and the "first" and "second" segments indicated in Table 7 indicate two segments interconnected at the connection points, respectively.

TABLE 7

| Connection Point: | Q1 |
|---|---|
| First Segment: | G1 |
| Second Segment: | G4 |
| Coordinates of Connection Point: | $(X_1, Y_1)$ |

The respective connection point data for the other connection points Q2–Q12 are also obtained, similarly to that for the connection point Q1.

As illustrated in FIG. 20, "connection line data" is then generated on the basis of the segment data. The connection line data includes information designating all of the segments G1–G12 (FIG. 21A) in the initial state in the loop detection process. Namely, Connection Line Data = (G1, G2, ..., G11, G12), in the initial state. The number of segments designated by the connection line data decreases as the loop detection process progresses (details of which are described later).

Furthermore, "loop data" is defined so as to include information representing a detected loop. Loop data is determined for each loop. For example, when the loop $L_a$ (FIG. 21B) is detected, loop data for the loop $L_a$ is generated as illustrated in Table 8.

TABLE 8

| Loop Data for Loop $L_a$ | |
|---|---|
| Serial Number of Loop: | $L_a$ |
| Number of Segments: | 4 |
| Serial Number of Segment: | G1, G2, G3, G4 |
| Serial Number of Connection Point Sequence Table: | TB($L_a$) |

In Table 8, the "number of segments" indicates the number of segments belonging to the loop $L_a$, and the segments are listed in the row "serial number of segment". The "connection point sequence table" is a data table in which the connection points Q5 and Q6 connecting the loop $L_a$ to other loops are listed in a clockwise direction in the segment point sequence Q1–Q6 existing on the loop $L_a$. The connection point sequence table TB ($L_a$) for the loop $L_a$ is indicated in Table 9, and other tables with respect to the other loops $L_b$ and $L_c$ are also generated.

TABLE 9

| Connection Point Sequence Table for Loop $L_a$ | |
|---|---|
| Serial Number of Connection Point Sequence Table: | TB($L_a$) |
| Contents of Table: | Q5, Q6 |

A storage area is reserved in the memory 25 for the "loop data set" (FIG. 20) including all of the loop data. In the initial stage, no loop has been detected yet, and therefore, Loop Data Set (in Initial State) = $(\phi)$. where the symbol $(\phi)$ expresses an empty set.

Figure 22A:
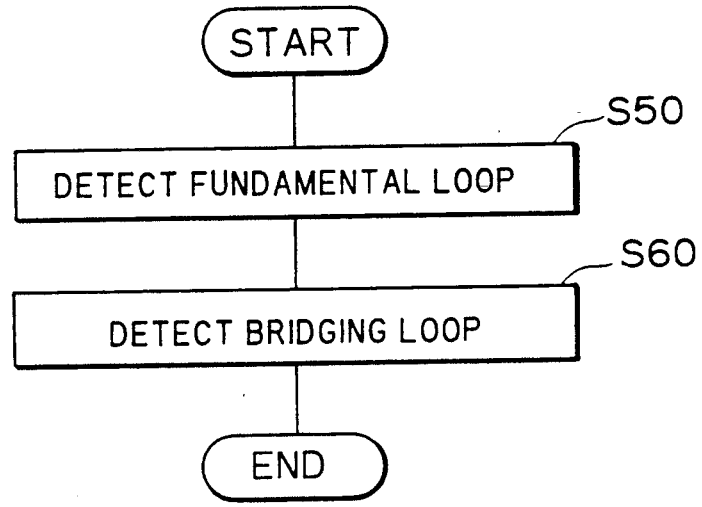
FIGS. 22(a)-(d) are a flowchart showing a loop detection process.
Figure 22B:
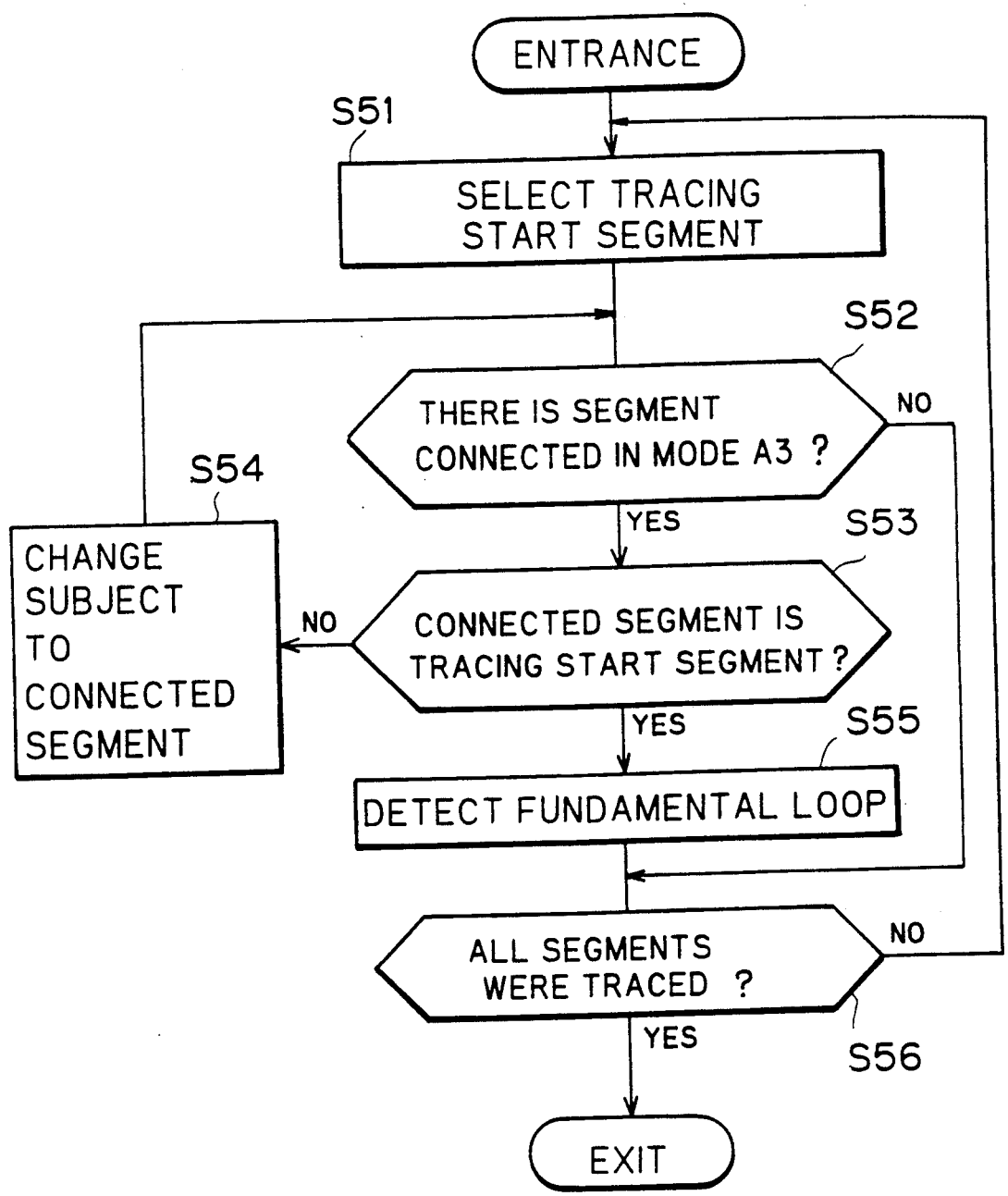

Under the condition where these data are prepared, the CPU 23 starts the process illustrated in FIG. 22A. In the first process step S50, a fundamental loop (apex interconnecting loop) (in which segments are interconnected only in the fundamental connection mode A3) is detected The detail of the detection step is illustrated in FIG. 22B, and a tracing start segment at which tracing is to be started is arbitrarily selected from all of the segments (process step S51). Assuming segment G5 (FIG. 21A) is selected, for example, a determination is made during process step S52 whether or not another segment is connected to the segment G5 in the fundamental connection mode A3, with reference to the connection mode data for the segment G5. As illustrated in FIG. 21A, the segment G6 is connected to the segment G5 in the mode A3. Therefore, the process proceeds to process step S53 to determine whether or not the segment G6 is the tracing start segment G5. Since the result of the judgement in process step S52 is "NO", the subject segment is changed to segment G6 in process step S54. The process then returns to step S52.

In process step S52, it is determined that no segment is connected to the segment G6 in the connection mode A3, where the segment G5 which has been subjected to the process step S52 is omitted during process step S52. Then, it is also determined that the sequence or chain consisting of the segments G5 and G6 cannot form a fundamental loop, and a new tracing step is started when the process returns to process step S51 through step S56.

When the segment G1 is selected as the new tracing start segment, the chain of segments G1–G4 is traced (these segments G1–G4 are serially interconnected in the connection mode A3). Then, the tracing reaches the tracing start segment G1, and the process proceeds to process step S55, in which it is determined that the set of segments G1–G4 forms the fundamental loop $L_a$. After detection of the loop $L_a$, information as to the segments G1–G4 is deleted from the connection line data and the loop data for the loop $L_a$ shown in Table 8 is produced. A similar process is conducted on the basis of the connection line data from which the segments G1–G4 were deleted, so that another fundamental loop $L_b$ is detected. When detection of the loop $L_a$ and $L_b$ is completed, the connection line data is changed to:
(G5, G6, G11, G12),
and the loop data set is:

$L_a = (G_1, G_2, G_3, G_4)$, $L_b = (G_7, G_8, G_9, G_{10})$

The segment data $G_1$, $G_2$, $G_3$ and $G_4$ forming the loop $L_a$ are registered in the memory 25 so that the loop $L_a$ is specified as an anticlockwise loop (Table 8). In other words, the tracing direction of the loop is detected, and, if it is determined that the loop was traced in the clockwise direction, the segment data are registered in reverse. The other loop $L_b$ is similarly registered. The reason for unifying the respective directions of loops to the anticlockwise direction will be described later.

The detected loops $L_a$ and $L_b$, and the remaining segments indicated by the current connection line data are indicated in FIG. 21B.

Figure 22C:
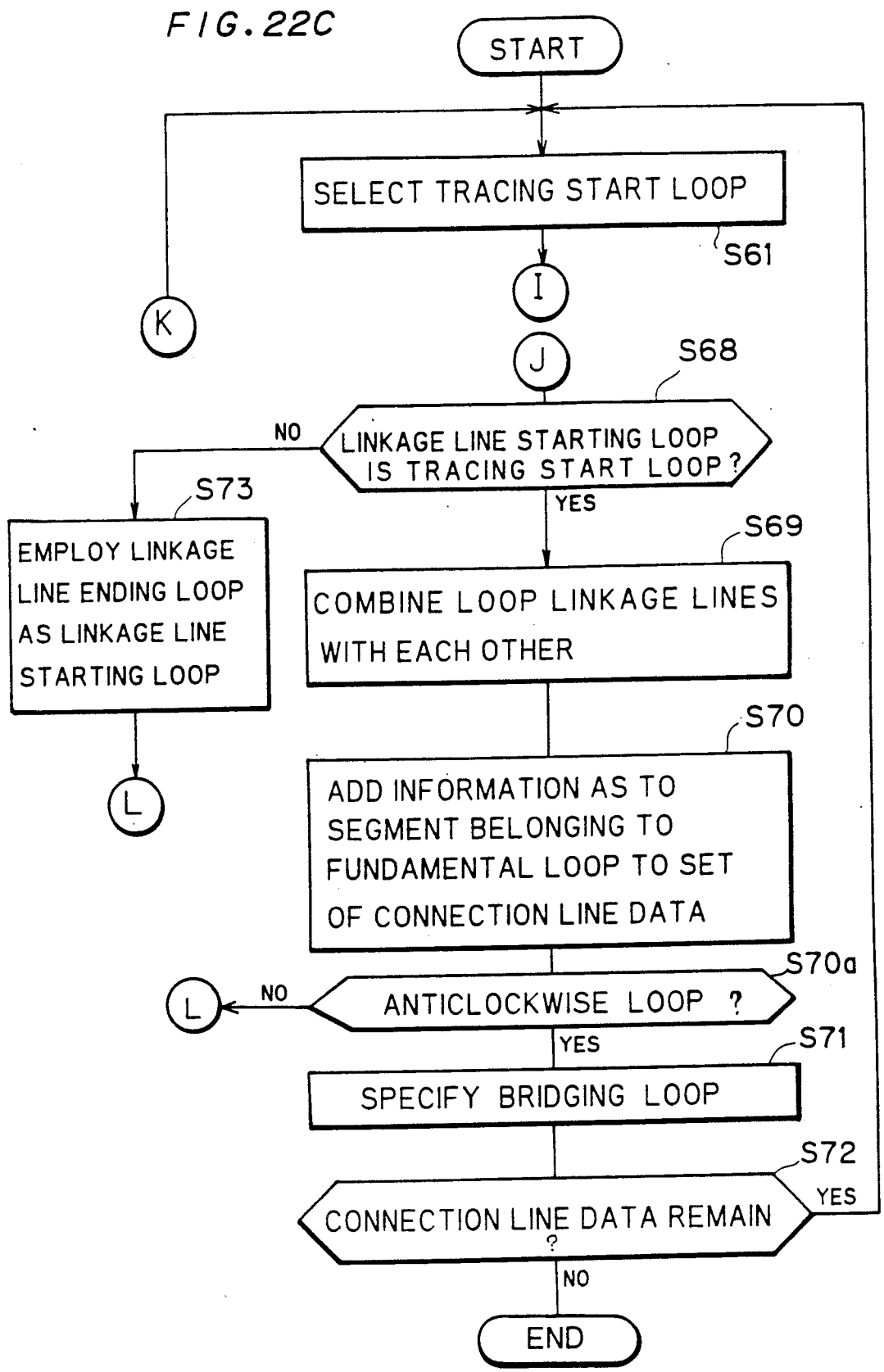
Figure 22D:
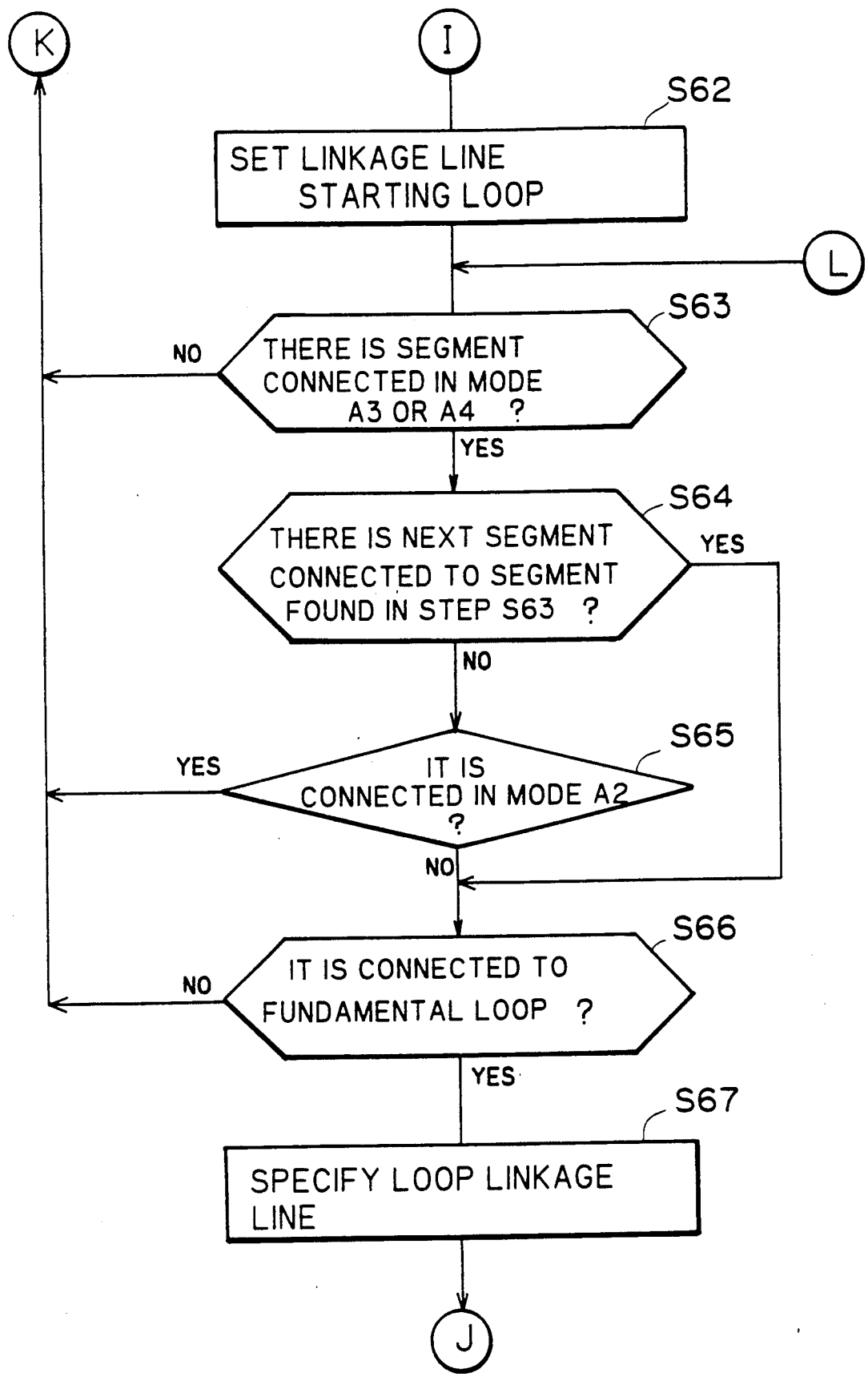

After detecting the fundamental loops $L_a$ and $L_b$, detection of a bridging loop is conducted in process step S60 (FIG. 22A, details of which are illustrated in FIG. 22C and FIG. 22D). In process step S61, one fundamental loop is arbitrarily selected from the detected fundamental loops $L_a$ and $L_b$. Assuming loop $L_a$ is selected, the loop $L_a$ is registered as a "linkage line starting loop" from which a loop $L_a$ in the connection mode A3 or A4, through a search in the segments remaining in the connection line data. Since the segments G1-G4 have been deleted from the connection line data, they are not subjected to the search.

Figure 23:
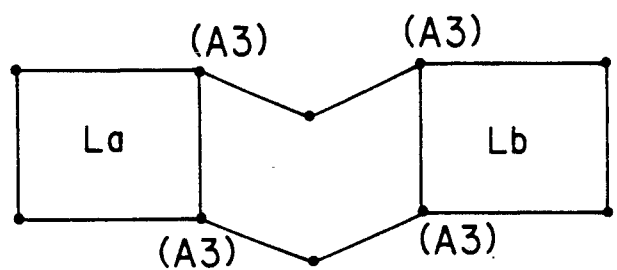
FIG. 23 is a diagram showing an example subjected to the loop detection.

When a segment connected to the loop $L_a$ in the mode A3 or A4 is found, the process proceeds to the next process step S64. FIG. 23 illustrates an example in which two segments are connected to the loop $L_a$ in the mode A3. On the other hand, in the example illustrated in FIG. 21B, two segments G5 and G12 are found connected to the loop $L_a$ in the mode A4. If two or more segments are found through the search, one of them, e.g., the segment G5, is arbitrarily selected, and then the process proceeds to process step S64. In step S64, it is judged whether or not there is another segment connected to the segment G5 in the connection mode A3. As illustrated in FIG. 21B, the segment G6 is connected to the segment G5 in the mode A3. Therefore, the process proceeds to step S66.

Since the segment G6 is connected to the fundamental loop $L_b$, the segments G5 and G6 are registered as a set of segments forming a loop linkage line (through steps S66 and S67).

Incidentally, during step S65, a segment in the mode A2 is ignored when the result of the judgement in step S64 is "NO", e.g., a determination is made that one or more segments are connected to the subjected segment only in the connection mode A4 or A2. This is because segments interconnected in the connection mode A2 are intercrossed segments (FIG. 16A) and it is not necessary to detect intercrossed segments during loop linkage line detection. Examples of intercrossed segments are illustrated in FIG. 3D as segments f-n at the point p16 and segments f-q at the point p19. No segments are interconnected in the mode A1 or the mode A2 without being intercrossed because the segments have been corrected to the perfect connection mode through the terminal point correction process described above in section "D".

After the loop linkage line $C_a$ (FIG. 21B) (consisting of the segments G5 and G6) is detected, it is judged whether or not the fundamental loop (linkage line ending loop $L_b$ which the loop linkage line $C_a$ reaches is the linkage line starting loop $L_a$. Since the loops $L_a$ and $L_b$ are different loops, the fundamental loop $L_b$ is reset as a linkage line starting loop in step S73, and the segment chain tracing process described above is repeated A segment from which tracing starts is selected from the segments connected to the new starting loop with reference to the connection point sequence table (details of which are described later) As the process is repeated, another loop linkage lin $C_b$ (FIG. 21B) is detected and the process proceeds to step S69 through step S68.

Figure 21C:
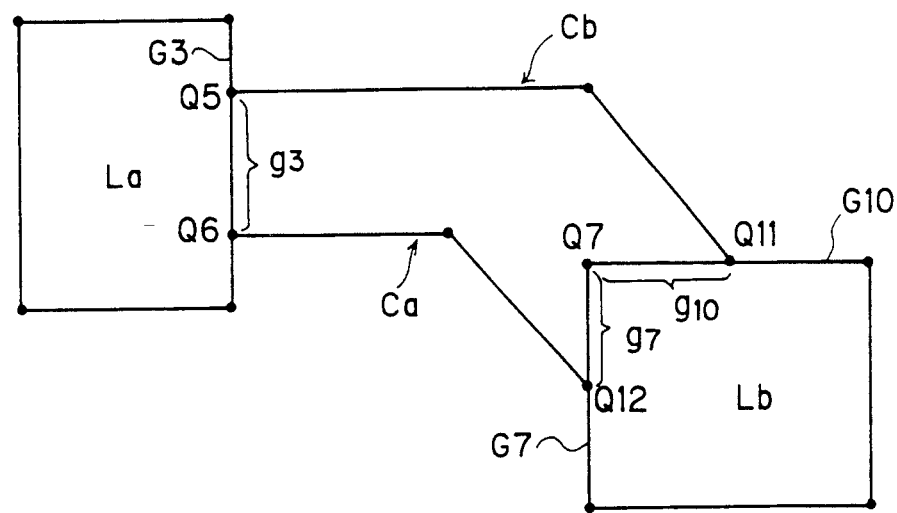

In step S69, data expressing the loop linkage lin $C_a$ and $C_b$ are combined. The information expressing the segments G3, G7 and G10 belonging to the fundamental loop $L_a$ or $L_b$ is combined with the data for the loop linkage lines $C_a$ and $C_b$ in process step S70, where the information concerning the segments G3, G7 and G10 expresses partial segments g3, g7 and g10 (FIG. 21C) obtained by clipping respective parts of the segments G3, G7 and G10 More particularly, the partial segments g3, g7 and g10 are defined as parts in the sections Q6-Q5, Q7-Q12 and Q11-Q7, respectively, where the points Q5, Q6, Q11 and Q12 are connection points between the fundamental loop $L_a$ or $L_b$ and the loop linkage line $C_a$ or $C_b$. Accordingly, the partial segments have the following start points and end points, respectively:

g3 = start point Q6, end point Q5,
g7 = start point Q7, end point Q12,
g10 = start point Q11, end point Q7.

The clipping process makes use of the connection point data. For example, in order to clip the partial segment g3, a determination is made as to which segments in the fundamental loop $L_a$ the connection points Q6 and Q5 belong to. Then, the respective coordinates of the start and end points of the partial segment g3 are obtained from the coordinats of the points Q6 and Q5.

Figure 21D:
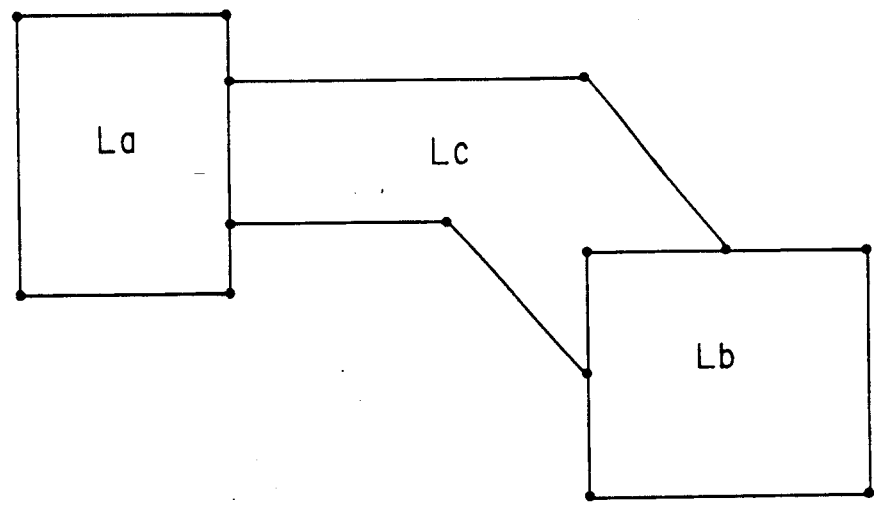

Then, the tracing direction of the loop Lc shown in FIG. 21D, which consists of the segments G5, G6, G1 and G12, and the partial segments g3, g7 and g10, is detected. When the loop $L_c$ is traced in the clockwise direction, the loop detection is regarded as an error and the process is returned to the step S63 through the step S70a for renewing the loop detection process. On the other hand, if the loop Lc is anticlockwise, the loop $L_c$ is specified as a bridging loop in the step S71, and loop data for the bridging loop $L_c$ is added to the loop data set. The reason for employing only an anticlockwise loop as a bridging loop will be described later. In the example illustrated in FIG. 21, no segment remains after the bridging loop $L_c$ is detected, and therefore, the loop detection process is completed through process step S72. When the graphic figure to be processed is as illustrated in FIG. 19E or FIG. 19D rather than as illustrated in FIG. 19C, the loops $L_p$, $L_q$ and $L_r$ are detected as "fundamental loops" and the loop $L_c$ is detected as a "bridging loop".

When a bridging loop is detected after another bridging loop is already detected, the "loop" referred to in steps S61, S70 and S66 means both a fundamental loop and a bridging loop already detected.

Now, the production and utilization of the connection point sequence table will be described. A connection point sequence table is produced and stored every time a new loop is detected. For example, when the loop $L_a$ is detected, the connection mode data is investigated to determine whether the fundamental loop $L_a$ is accompanied with the connection points Q5 and Q6. Then, the data expressing the connection points Q5 and Q6 are written in a new connection point sequence table in which the connection points Q5 and Q6 are listed along a clockwise direction around the loop (see Table 9).

Figure 24A:
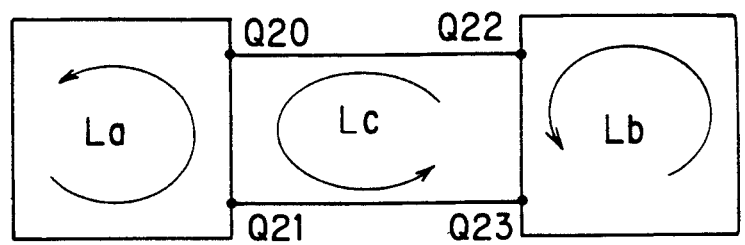
FIGS. 24(a)-(c) are is an explanatory diagram showing a briding loop detection process.

When detecting a bridging loop, the connection point sequence table is referred to, and a connection point immediately following the connection point at which the tracing reached the fundamental loop is selected as the next tracing start point. To detect a bridging loop without making a mistake concerning the tracing direction thereof, the respective directions of the detected loops are all set in an anticlockwise direction, and the sequence order or direction at which the connection points are registered in the connection point table is set at the clockwise direction. The reason therefor is as follows:

As illustrated in FIG. 24A, when the fundamental loops $L_a$ and $L_b$ are registered in the anticlockwise direction and the sets of the connection points (Q20, Q21) and (Q22, Q23) belonging to loops $L_a$ and $L_b$, respectively, are registered in the clockwise direction in the connection point sequence table, the bridging loop $L_c$ in the anticlockwise direction can be detected by tracing the connection points in the connection point sequence table along the sequence at which the connection points are registered.

In other words, the upward direction from the point Q21 to the point Q20 corresponds to the anticlockwise direction in the loop $L_a$ in FIG. 24A, while the downward direction from Q20 to Q21 corresponds to the anticlockwise direction in the loop $L_c$. Therefore, the points Q20 and Q21 must be registered in the connection point sequence table in the direction opposite to that in the loop data in order to unify the respective directions of all of the loops. The connection points are registered in the clockwise direction as loop data while they are registered in the connection point sequence table in the anticlockwise direction, in place of the registering rule indicated above. Either procedure may be employed so long as the tracing direction of a loop and the sequence or direction of the connection points in the connection point sequence table are opposite to each other.

Figure 24B:
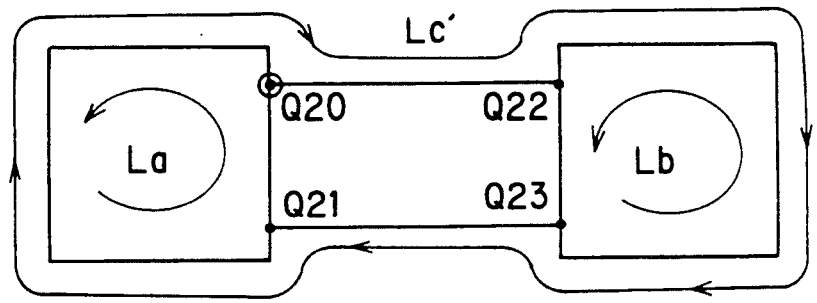
Figure 24C:
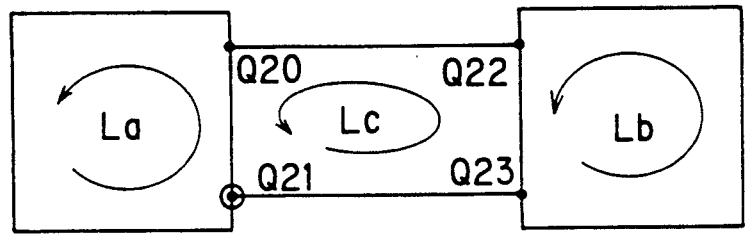

Nevertheless, an ambiguity in the direction of the bridging loop $L_c$ may remain. For example, when tracing starts at the point Q20 (FIG. 24B), the points Q22, Q23 and Q21 are serially detected in order, to obtain a clockwise loop $L_c'$. If such a clockwise loop is included in the loop data, the following process for identifying fillin9 re9ions and unfilling regions will cause errors in some cases. In order to prevent the errors, the direction of the loop just found is detected and, when it is the clockwise direction, the loop is abandoned and another tracing start point Q21 (FIG. 24C) is selected to repeat the loop detection process until an anticlockwise loop $L_c$ is obtained. This is the purpose of step S70a in FIG. 22C. By constructing the connection point sequence table according to the above indicated rule and by tracing the connection points therein in the registered sequence, the anticlockwise bridging loop $L_c$ can be obtained without ambiguity. The sequence in the connection point sequence table is interpreted as a cyclical order, and therefore, the connection point following the point Q6 in Table 9 is the point Q5.

Through the foregoing process, loops A-F (FIG. 3E) for the graphic figures illustrated in FIG. 3D are detected. Once all of the loops are detected, it is not necessary to distinguish between the fundamental loop and the bridging loop, and thereafter each of them is referred to as a "loop".

F. Detail of Imaqe Data Generation for Fillinc

After the loop detection is completed, the inclusion relationship between the detected loops is investigated. During such an investigation, rectangular approximation and the quadruple branching classification, as described above, are again employed. However, contrary to the segment classification process already conducted, the margins $\Delta X_1$ and $\Delta Y_1$ are set at zero in the present process since imperfect connection modes have already been corrected and the loops formed by the segments a-t have perfect shapes. Furthermore, rectangular approximation is applied to the loops A-F rather than the segments a-t. Therefore, rectangles $V_A$-$V_F$ illustrated in FIG. 3F are obtained from the loops A-F shown in FIG. 3E by the rectangular approximation process.

Figure 25:
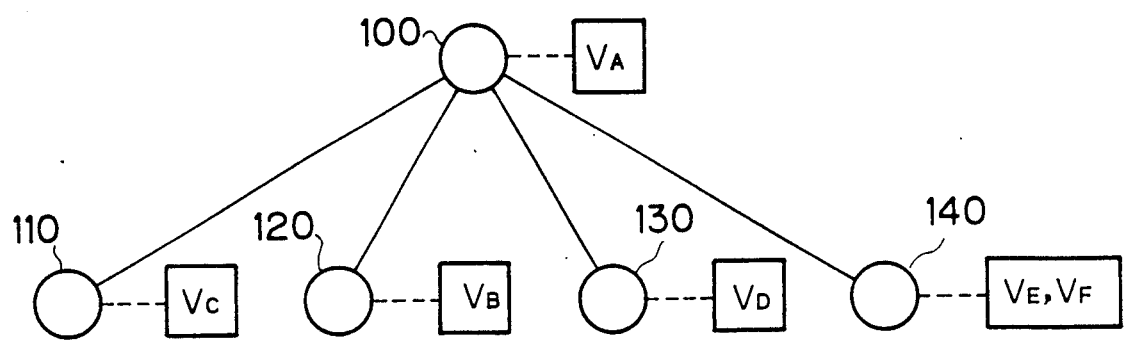
FIG. 25 is an explanatory diagram showing a quadruple branching classification method for investigating an inclusion relationship between loops.

When rectangles $V_A$-$V_F$ are subjected to quadruple branching classification, a tree illustrated in FIG. 25 is obtained. The rectangles $V_A$-$V_F$ (or the loops A-F) belong to the whole area 100 of the image plane and the divisional areas 110-140, in the relationship of:

$[100] = (V_A)$ $[110] = (V_C)$ $[120] = (V_B)$ $[130] = (V_D)$ $[140] = (V_E, V_F)$

After classification is completed, the inclusion relationships between the loops A-F are investigated. In the investigation, the inclusion relationships between the rectangular regions belonging to the higher rank region or node 100 and that belonging to the lower rank regions or nodes 110-140 are investigated as well as the inclusion relationship between the rectangular regions both of which belong to a common node. The inclusion relationships between the regions 110-140 belonging to different branches are not subjected to the investigation because the lower rank regions 110-140 are relatively exclusive and because it can be previously determined that the rectangular regions belonging to the nodes, e.g., 110 and 140, classified into the different branches do not have an inclusion relationship therebetween.

The investigation may be conducted through a comparison between the respective apex coordinates of the rectangular region $V_A$-$V_F$. In the example shown in FIG. 3, it is determined through the investigation that the rectangular regions $V_B$-$V_F$ are included in the rectangular region $V_A$.

Then, the inclusion relationships between the respective loops A-F corresponding to the regions $V_A$-$V_F$ are investigated. The investigation is conducted only for the loops belonging to the rectangular regions between which an inclusion relationship is determined. Therefore, in the example illustrated in FIG. 3E, only the respective parts of loops A-B, A-C, . . . and A-F are subjected to the investigation.

Figure 26:
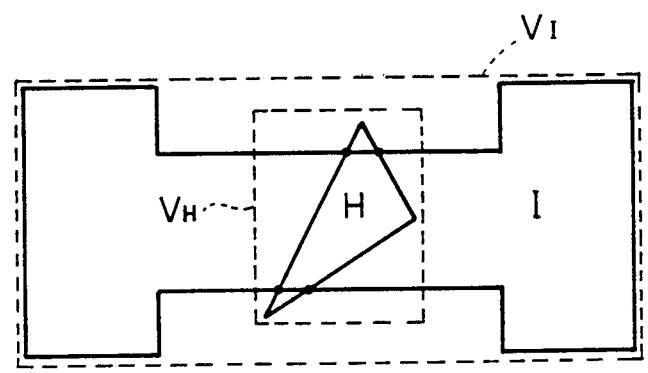
FIG. 26 is an explanatory diagram showing a principle for investigating the inclusion relationship between the loops.

For example, it is first judged whether or not the subjected loops A and B cross each other and, when the loops do not cross each other, then it is further judged whether or not a point arbitrarily selected from points existing on one loop is located in the area surrounded by the other loop. In the example illustrated in FIG. 26, a rectangular region $V_H$ is included in another rectangular region V$_f$. However, it is also determined that a loop H is not included in a loop I since the loops H and I cross each other. The detection of such a cross may be achieved by determining whether there are connection modes A2, A4, B5 and/or C3 in the respective connection mode data of the loops H and I. In the example illustrated in FIG. 3E, all of the loops B-F are included in the loop A.

In the next step, regions to be exposed (to be filled with a solid or a tint) are automatically designated. When the inner region of the outermost loop A is to be filled, the respective inner region of the inner loops B-F are designated as a non-filling region. In other words, "filling" and "non-filling" are alternately designated from the higher rank loop to the lower rank loop according to the inclusion order.

The designation is conducted by resetting the respective directions of the segments or vectors a-t forming the loops A-F, i.e., by resetting the respective start and end points of the segments or vectors a-t within the respective terminal points thereof. When the left hand side region of a segment with respect to the direction of the segment is to be filled while the right hand side region thereof is not to be filled, the respective directions of the segments a-t (FIG. 3G) are reset so that the loop A is an anticlockwise loop and the other loops B-F are clockwise loops. The region W (FIG. 3G) is to the left of the loops A-F. In the following recording process, it can be determined that the region W is a "filling region" rather than a "non-filling" region. Changing directions is achieved by exchanging the start and end points of the segments. Resetting the directions of the segments is carried out in the segment data. In other words, information indicating the positional relationship between a segment and a filling region is given to the segment data by resetting the respective coordinates of the start and end points of the segments.

Since the rectangular approximation and the quadruple branching classification method are employed in the detection of the inclusion relationships between the loops, the detection efficiency is further improved in the preferred embodiment.

Figure 27:
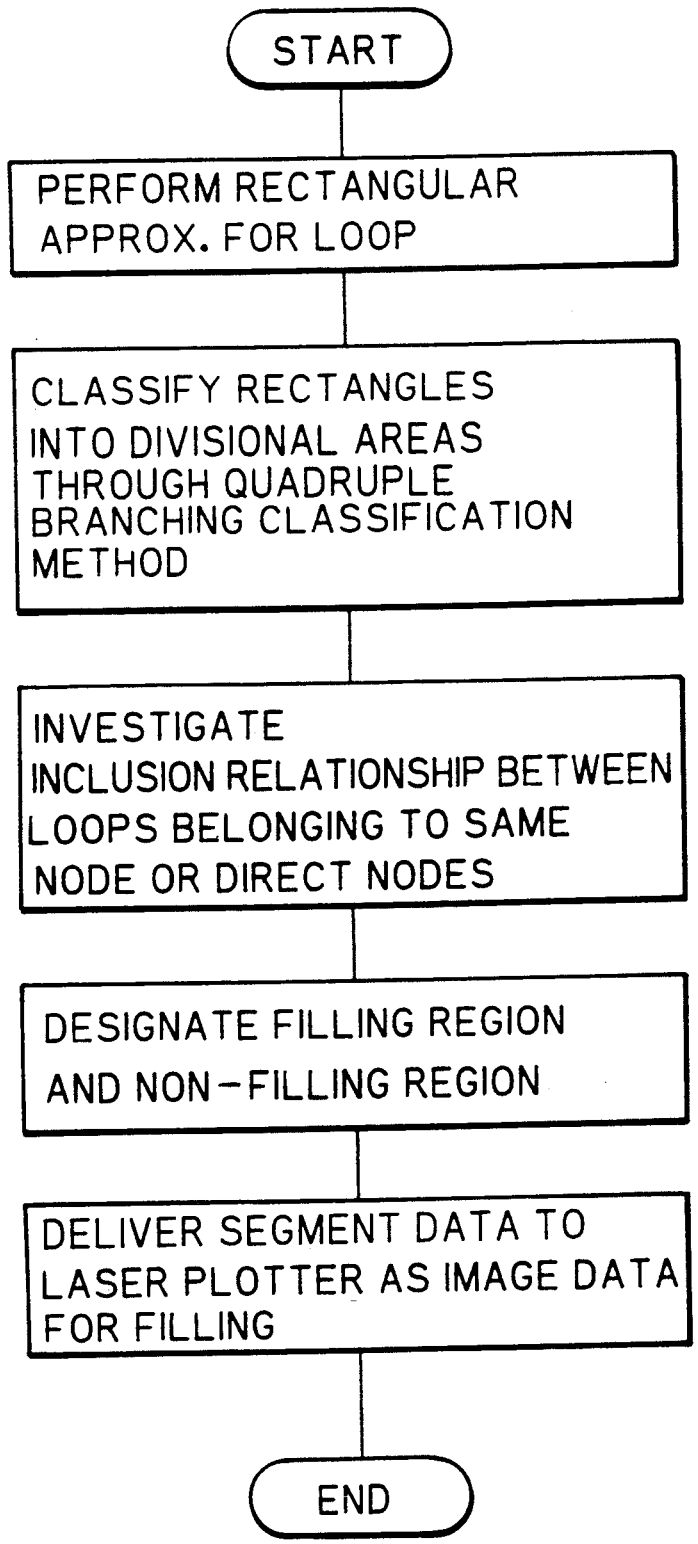
FIG. 27 is a flowchart showing a process for generating an image data to be delivered to a laser plotter.

The segment data (after having been subjected to the above indicated processing) are delivered from the image data converter 20 to the laser plotter 30 as image data for filling the inner or outer regions of the graphic figures. The delivery of the image data may be performed through either on-line communication or off-line communication. The process described above is indicated in FIG. 27.

G. Detail of the Operation of the Laser Plotter 30

The segment data corresponding to the graphic figures illustrated in FIG. 3G are delivered to the raster converter 31 in the laser plotter 30. The raster converter 31 calculates the respective coordinates of the points (e.g., the points u$_1$-u$_6$ in FIG. 3H) at which a main scanning line SL crosses the segments forming the loops A-F. Although only one main scanning line is illustrated in FIG. 3H, there are many parallel main scanning lines and the process is carried out along each of the main scanning lines. From the coordinates thus obtained, run lengths l$_1$-l$_7$ in the image plane 100 are calculated. For example, the run-length l$_2$ is obtained as l$_2$ = u$_1$ - u$_2$.

The interface circuit 32 controls the laser beam supplied from the laser oscillator 33 to the photosensitive material 34 on the basis of the run length data l$_1$-l$_7$ so that the laser beam is continuously activated while the soanner sweeps the interval l$_1$, and is then continuously inactivated while the scanner sweeps the interval l$_2$. A similar operation is performed with respect to the intervals l$_3$-l$_7$. Whether the laser beam is to be turned-on or turned-off when the scanner crosses a segment is determined by comparing the respective subscanning coordinates of the start and end points of the segment. If the subscanning coordinate of the start point is smaller than that of the end point, the vector expressing the segment is directed downward in the image plane 100. Therefore, when a scanner (scanning from the left side of the image plane 100) reaches the right side of a segment (with respect to the downward direction of the segment) the laser beam is turned on as it crosses the segment. On the other hand, if the subscanning coordinate of the start point is larger than that of the end point, i.e., the vector expressing the segment is directed upward, then the laser beam is turned off when the scanner crosses the segment.

Furthermore, when the scanner successively crosses two segments both of which are directed downward, a turn off designation is registered twice and the laser beam is continuously inactivated until a turn on designation is given twice.

By scanning the photosensitive film 34 with the laser beam in accordance with the above-described process, regions on the photosensitive film 34 corresponding to the hatched parts in FIG. 3H are exposed to obtain a desired recorded image.

H. Modifications

The segment data may be prepared in an apparatus other than the CAD system, and the image data converter according to the present invention can be applied to several systems in which image data expressed by a set of segment data is converted for recording purposes. The filled image may be recorded on a medium or displayed on a CRT. The present invention can also be applied to a dot image recorder.

In the present invention, since the connection mode data are generated on the basis of the connection relationships between the respective terminal points of the segments and the terminal point correction is conducted in response to the connection mode data, the image data required for automatically filling the inner or outer region of a graphic figure can be obtained at a high speed and at a high efficiency even if the segment data are imperfectly prepared.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A method of processing data for use in filling a region which is inside or outside of a graphic figure, said method comprising:
    (a) preparing segment data representative of segments which form a contour of a graphic figure on an image plane, said segments defining connection modes therebetween;
    (b) using said segment data to generate connection mode data representative of said connection modes;

(c) using said connection mode data to select a first one of said segments, said first segment having a floating terminal point;

(d) subsequent to said step (c), correcting said segment data and said connection mode data so that said first segment does not have a floating terminal point;

(e) subsequent to said step (d), using said connection mode data to detect a loop formed by said segments and to obtain loop data representative of said loop; and (f) subsequent to said step (e), using said loop data and said segment data to obtain data for use in filling a region which is inside or outside of said loop;

wherein each one of said connection modes is classified as either a perfect connection mode or an imperfect connection mode, said perfect connection mode being defined as a mode in which a terminal point of a segment coincides with a terminal point of another segment, said imperfect connection mode being defined as a mode other than said perfect connection mode; and wherein said step (c) includes using said connection mode data to detect a segment which is connected to another segment in an imperfect connection mode.

2. The method of claim 1, wherein said step (b) includes the steps of:

(b-1) generating data for a plurality of rectangles on said image plane, said rectangles surrounding said segments;

(b-2) selecting interrelated rectangles from among said plurality of rectangles, said interrelated rectangles surrounding a plurality of said segments, said interrelated rectangles overlapping each other on said image plane; and (b-3) determining the respective connection modes between said segments surrounded by said interrelated rectangles.

3. The method of claim 2, wherein said step (b-2) includes the steps of:

(b-2-1) dividing said image plane repeatedly to obtain a tree of divisional areas, each one of said divisional areas being related to another of asid divisional areas according to a predetermined sequence of division;

(b-2-2) comparing each of said plurality of rectangles with said divisional areas to determine respective minimum divisional areas which include said rectangles; and (b-2-3) identifying respective minimum divisional areas which are related according to said sequence.

4. The method of claim 2, wherein said interrelated rectangles surround said segments with a predetermined margin.

5. The method of claim 2, further comprising the step of delivering said data for use in filling said region to an iamge recorder to fill said region along scanning lines; each of said rectangles having two pairs of opposite sides, one of said pairs being parallel to said scanning lines.

6. The method of claim 1 further comprising the step of storing said connection mode data in a memory as a data base.

7. The method of claim 1, wherein:
said step (e) includes the steps of:
(e-1) detecting a fundamental loop in which segments are serially connected only in a fundamental connection mode, said fundamental connection mode being defined as a mode wherien a terminal point of one segment coincides with a terminal point of another segment; and (e-2) detecting a bridging loop formed by a segment bidging between detected loops; and said loop data is representative of said fundamental loops and said bridging loop.

8. The method of claim 7, wherein:
said step (e) further includes the steps of:
(e-3) generating a connection point sequence table, said connection point sequence table representing a sequence of connection points of a first loop, said connection points being points at which said first loop is connected to segments other than segments forming said first loop; and said step (e-2) includes the steps of:
(e-2-1) tracing a chain of segments from said first loop to a second loop;
(e-2-2) subsequent to said step (e-2-1), selecting a second connection point from said connection point sequence table, said second connection point following a connection point at which said tracing reaches said second loop; and
(e-2-3) tracing a chain of segments from said second connection point.

9. The method of claim 1, wherein:
said segments are vectors, each of said vectors being defined by a start point and an end point, said segment data including coordinates of said start points and said end points;

a plurality of loops are detected during said step (e), said loops including clockwise loops and counterclockwise loops determined with respect to the direction of said vectors; and said step (f) includes the steps of:
(f-1) determining a mutual inclusion relationship between said plurality of loops; and
(f-2) changing the start point and end point of each vector so that a clockwise loop adn an anticlockwise loop occur alternately within said mutual inclusion relationship, provided that an outermost loop has a loop direction determined according to a plan for filling a graphic figure.

10. The method of claim 1, wherein said segment data is adapted for use in a cutting machine.

11. A data processor for converting segment data representative of segments which form a contour of a graphic figure into image data for filling a region which is inside or outside of said graphic figure, said data processor comprising:

(a) connection mode data generating means for generating connection mode data representative of connection modes between segments which form a contour of a graphic figure, each one of said connection modes being classified as either a perfect connection mode or an imperfect connection mode, said perfect connection mode being defined as a mode in which a terminal point of a segment coincides with a terminal point of another segment, said imperfect connection mode being defined as a mode other than said perfect connection mode, said segments being represented by segment data;

(b) a memory for storing said connection mode data as a data base;

(c) correction means for (1) using said connection mode data to detect a segment which is connected to another segment in an imperfect connection mode and (2) correcting said segment data and said connection mode data to create corrected data representative of a state wherein a terminal point of each of said segments coincides with a terminal point of another of said segments;
(d) a loop detecting means for detecting a loop formed by said segments with reference to said corrected data to obtain loop data representative of said loop; and
(e) image data generating means for generating image data for filling a region which is inside or outside of said loop, said image data generating means being responsive to said loop data and said segment data.

12. The data processor of claim 11, wherein said connection mode data generating means includes:
   (a-1) positional relationship determining means for determining a positional relationship between a terminal point of a segment and a terminal point of another segment; and
   (a-2) means for generating said connection mode data according to said positional relationship.

13. The data processor of claim 12, wherein said connection mode data generating means further includes:
   (a-3) means for generating data for a plurality of rectangles surrounding said segments in an image plane;
   (a-4) means for selecting interrelated rectangles from among said plurality of rectangles, said interrelated rectangles overlapping each other on said image plane; and
   (a-5) means for delivering a portion of said segment data corresponding to segments surrounded by said interrelated rectangles to said positional relationship determining means.

14. The data processor of claim 11, wherein said loop detecting means includes:
   (d-1) means for tracing a chain of segments which are serially connected only in a fundamental connection mode to detect a fundamental loop, said fundamental connection mode being defined as a mode wherein a terminal point of a segment coincides with a terminal point of anotehr segment, said fundamental loop being defined as a loop in whcih segments are serially connected only in said fundamental connection mode;
   (d-2) means for tracing a chain of segments to detect a bridging loop; and
   (d-3) means for generating said loop data with respect to both sid fundamental loops and said bridging loop.

15. A method of sorting segments defined with respect to an image plane into segment groups to detect a loop formed by said segments in each of said segment groups, said method comprising:
   (a) receiving segment data representative of segments defined with respect to an image plane;
   (b) generating data for rectangles which surround said segments in said image plane;
   (c) determining areas in which said rectangles are located on said image plane;
   (d) sorting said rectangles into rectangle groups so that all of said rectangles which belong to one of said areas are identified as a rectangle group; and
   (e) sorting said segments into segment groups, each one of said segment groups including segments corresponding to rectangles of a rectangle group.

16. The method of claim 15, wherein said rectangles define predetermined margins around said segments.

17. The method of claim 15, wherein:
   said step (c) includes the steps of:
   (c-1) repeatedly dividing said image plane to obtain a tree of divisional areas in which each of said divisional areas is related according to a predetermined sequence of division; and
   (c-2) comparing each of said rectangles with said divisional areas to determine minimum divisional areas which include said rectangles; and
   said step (d) includes sorting said rectangles according to said minimum divisional areas.

* * * * *